United States Patent
Zhang et al.

(10) Patent No.: US 9,258,044 B2
(45) Date of Patent: Feb. 9, 2016

(54) METHOD FOR FEEDING BACK PRECODING MATRIX INDICATOR, RECEIVE END AND TRANSMIT END

(71) Applicant: Huawei Technologies Co., Ltd., Shenzhen (CN)

(72) Inventors: Leiming Zhang, Beijing (CN); Qiang Wu, Beijing (CN); Jianghua Liu, Beijing (CN); Jianguo Wang, Bonn (DE)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 14/844,714

(22) Filed: Sep. 3, 2015

(65) Prior Publication Data

US 2015/0381249 A1  Dec. 31, 2015

Related U.S. Application Data

(63) Continuation of application No. PCT/CN2013/075834, filed on May 17, 2013.

(30) Foreign Application Priority Data

Mar. 8, 2013 (CN) ................. PCT/CN2013/072358

(51) Int. Cl.
*H04B 7/02* (2006.01)
*H04B 7/04* (2006.01)
(Continued)

(52) U.S. Cl.
CPC ............ *H04B 7/0456* (2013.01); *H04B 7/0639* (2013.01); *H04B 7/0691* (2013.01); *H04L 1/0026* (2013.01)

(58) Field of Classification Search
CPC .. H04B 7/0639; H04B 7/0691; H04B 7/0456; H04B 7/0626; H04B 7/0478; H04B 7/0617; H04B 7/024; H04L 1/0026; H04L 1/00
USPC ................. 375/219, 267, 285, 295, 299, 316, 375/346–347, 349–350; 370/329, 330
See application file for complete search history.

(56) References Cited

U.S. PATENT DOCUMENTS 8,676,133 B2 * 3/2014 Montojo ................ H04B 7/061
 370/208
8,971,381 B2 * 3/2015 Seo ........................ H04J 13/18
 370/328

(Continued)

FOREIGN PATENT DOCUMENTS

CN 102164027 A 8/2011
CN 102273091 A 12/2011

(Continued)

OTHER PUBLICATIONS

"Further Downlink MIMO Enhancement for LTE-Advanced-Performance Part," 3GPP™ Work Item Description (Published no later than Dec. 3, 2015).

(Continued)

*Primary Examiner* — Khanh C Tran
(74) *Attorney, Agent, or Firm* — Leydig, Voit & Mayer, Ltd.

(57) ABSTRACT

The present disclosure provides a method for feeding back a precoding matrix indicator, a receive end and a transmit end, where the method includes: selecting, by a receive end, a precoding matrix W from a codebook based on a reference signal, where $$W \in \begin{bmatrix} X_1(\theta_1) \\ X_2(\theta_2, \varphi_n) \end{bmatrix},$$

the $\theta_1$ and the $\theta_2$ indicate a phase difference of weighted values for signal transmission between two neighboring antennas in a first antenna group of a transmit end and a phase difference of weighted values for signal transmission between two neighboring antennas in a second antenna group of the transmit end, the $\varphi_n$ indicates a phase difference of weighted values for signal transmission between the first antenna group and the second antenna group, where the signal transmission between the first antenna group and the second antenna group is for a same transmission layer, $$\varphi_n = e^{\frac{j2\pi n}{M}},$$

and sending, by the receive end, a precoding matrix indicator PMI to the transmit end.

18 Claims, 4 Drawing Sheets

A receive end selects a precoding matrix W from a codebook based on a reference signal — 101

The receive end sends a precoding matrix indicator PMI to the base station, that is, the transmit end, so that the base station, that is, the transmit end obtains the precoding matrix W according to the PMI — 102

(51) Int. Cl.
*H04B 7/06* (2006.01)
*H04L 1/00* (2006.01)

(56) References Cited

U.S. PATENT DOCUMENTS

| | | | |
|---|---|---|---|
| 2008/0043865 A1 | 2/2008 | Kim et al. | |
| 2009/0154411 A1 | 6/2009 | Kikuchi et al. | |
| 2011/0205930 A1 | 8/2011 | Rahman et al. | |
| 2013/0128832 A1* | 5/2013 | Kang | H04W 72/042 370/329 |
| 2013/0230081 A1* | 9/2013 | Wernersson | H04B 7/0617 375/219 |
| 2014/0038619 A1* | 2/2014 | Moulsley | H04B 7/024 455/466 |
| 2014/0192768 A1* | 7/2014 | Yeh | H04B 7/0456 370/330 |
| 2014/0247860 A1* | 9/2014 | Zhu | H04W 36/14 375/219 |
| 2015/0124736 A1* | 5/2015 | Ko | H04B 7/0626 370/329 |
| 2015/0180557 A1* | 6/2015 | Kim | H04B 7/0456 375/267 |
| 2015/0318908 A1* | 11/2015 | Ko | H04L 1/00 375/267 |

FOREIGN PATENT DOCUMENTS

| | | |
|---|---|---|
| CN | 102291199 A | 12/2011 |
| CN | 102301666 A | 12/2011 |
| CN | 102594502 A | 7/2012 |

OTHER PUBLICATIONS

"Further Downlink MIMO Enhancement for LTE-Advanced-Feature," 3GPP™ Work Item Description (Published no later than Dec. 3, 2015).

"Further Downlink MIMO Enhancement for LTE-Advanced-Core Part," 3GPP™ Work Item Description (Published no later than Dec. 3, 2015).

* cited by examiner

METHOD FOR FEEDING BACK PRECODING MATRIX INDICATOR, RECEIVE END AND TRANSMIT END

CROSS-REFERENCE TO RELATED APPLICATIONS

This application is a continuation of International Patent Application No. PCT/CN2013/075834, filed on May 17, 2013, which claims priority to International Patent Application PCT/CN2013/072358, filed on Mar. 8, 2013, both of which are herein incorporated by reference in their entirety.

TECHNICAL FIELD

Embodiments of the present disclosure relate to the field of wireless communications, and in particular, to a method for feeding back a precoding matrix indicator, a receive end and a transmit end.

BACKGROUND

A multiple input multiple output (MIMO) wireless communications system may obtain diversity and array gains by using a transmit precoding technology and a receive signal combination technology. A system using precoding may be indicated as $$y = H\hat{V}s + n$$

where y is a vector of a received signal, H is a channel matrix, $\hat{V}$ is a precoding matrix, s is a vector of a transmitted symbol, and n is a measured noise.

Optimal precoding generally requires that a transmitter completely knows channel state information (CSI). A frequently used method is that user equipment (UE) quantizes instantaneous CSI and reports the quantized instantaneous CSI to a base station, where the user equipment includes a mobile station (MS), a relay (Relay), a mobile telephone (Mobile Telephone), a handset (handset), portable equipment (portable equipment) and the like, and the base station includes a node B (NodeB) base station (BS), an access point (Access Point), a transmission point (TP), an evolved node B (eNB), a relay (Relay) or the like. CSI information reported by an existing Long Term Evolution (LTE) system includes information about a rank indicator (RI), information about a precoding matrix indicator (PMI), information about a channel quality indicator (CQI), and the like, where the RI and the PMI respectively indicate a quantity of transmission layers and a precoding matrix that are used. A set of precoding matrices in use is generally referred to as a codebook, and each of the precoding matrices is a codeword in the codebook.

Codebook design used in existing LTE systems is all based on inter-antenna strong related features. However, as a spacing between two antennas in the same polarization direction increases, an inter-antenna correlation gradually decreases, while phase differences between antenna elements involved in a codebook based on inter-antenna strong related features all keep consistent. Therefore, when the existing codebook design is applied to a scenario in which a large spacing is configured between antennas, good matching cannot be achieved, which results in that the precision at which a base station performs precoding according to PMI information fed back by UE is reduced, thereby causing a large performance loss, and reducing the system throughput.

SUMMARY

Embodiments of the present disclosure provide a method for feeding back a precoding matrix indicator, a receive end and a transmit end, which can improve the precoding precision, thereby reducing the performance loss, and improving the system throughput.

According to a first aspect, a method for feeding back a precoding matrix indicator is provided, where the method includes: selecting, by a receive end, a precoding matrix W from a codebook based on a reference signal, where the $$W \in \begin{bmatrix} X_1(\theta_1) \\ X_2(\theta_2, \varphi_n) \end{bmatrix},$$

a matrix $X_1$ is determined according to $\theta_1$, a matrix $X_2$ is determined according to $\theta_2$ and $\varphi_n$, the $\theta_1$ indicates a phase difference of weighted values for signal transmission between two neighboring antennas in a first antenna group of a transmit end, where the signal transmission between the two neighboring antennas in the first antenna group is for a same transmission layer, the $\theta_2$ indicates a phase difference of weighted values for signal transmission between two neighboring antennas in a second antenna group of the transmit end, where the signal transmission between the two neighboring antennas in the second antenna group is for the same transmission layer, the $\varphi_n$ indicates a phase difference of weighted values for signal transmission between the first antenna group and the second antenna group, where the signal transmission between the first antenna group and the second antenna group is for a same transmission layer, the $$\varphi_n = e^{\frac{j2\pi n}{M}},$$

the M is a positive integer, the n is a non-negative integer less than the M, $\theta_1$ and $\theta_2$ of at least one precoding matrix in the codebook are different, and the first antenna group and the second antenna group belong to a same multi-antenna system; and sending, by the receive end, a precoding matrix indicator PMI to the transmit end, so that the transmit end determines the W according to the PMI. According to a second aspect, a method for receiving a precoding matrix indicator is provided, where the method includes: receiving, by a transmit end, a precoding matrix indicator PMI sent by a receive end; and determining, by the transmit end according to the precoding matrix indicator PMI, a precoding matrix W that is selected by the receive end from a codebook based on a reference signal, where the $$W \in \begin{bmatrix} X_1(\theta_1) \\ X_2(\theta_2, \varphi_n) \end{bmatrix},$$

a matrix $X_1$ is determined according to $\theta_1$, a matrix $X_2$ is determined according to $\theta_2$ and $\varphi_n$, the $\theta_1$ indicates a phase difference of weighted values for signal transmission between two neighboring antennas in a first antenna group of the transmit end, where the signal transmission between the two neighboring antennas in the first antenna group is for a same transmission layer, the $\theta_2$ indicates a phase difference of weighted values for signal transmission between two neighboring antennas in a second antenna group of the transmit end, where the signal transmission between the two neighboring antennas in the second antenna group is for the same transmission layer, the $\varphi_n$ indicates a phase difference of weighted values for signal transmission between the first antenna group and the second antenna group, where the signal transmission between the first antenna group and the second antenna group is for a same transmission layer, the $$\varphi_n = e^{j\frac{2\pi n}{M}},$$

the M is a positive integer, the n is a non-negative integer less than the M, $\theta_1$ and $\theta_2$ of at least one precoding matrix in the codebook are different, and the first antenna group and the second antenna group belong to a same multi-antenna system.

According to a third aspect, a receive end is provided, where the receive end includes: a selection unit, configured to select a precoding matrix W from a codebook based on a reference signal, where the $$W \in \begin{bmatrix} X_1(\theta_1) \\ X_2(\theta_2, \varphi_n) \end{bmatrix},$$

a matrix $X_1$ is determined according to $\theta_1$, a matrix $X_2$ is determined according to $\theta_2$ and $\phi_n$, the $\theta_1$ indicates a phase difference of weighted values for signal transmission between two neighboring antennas in a first antenna group of a transmit end, where the signal transmission between the two neighboring antennas in the first antenna group is for a same transmission layer, the $\theta_2$ indicates a phase difference of weighted values for signal transmission between two neighboring antennas in a second antenna group of the transmit end, where the signal transmission between the two neighboring antennas in the second antenna group is for the same transmission layer, the $\phi_n$ indicates a phase difference of weighted values for signal transmission between the first antenna group and the second antenna group, where the signal transmission between the first antenna group and the second antenna group is for a same transmission layer, the $$\varphi_n = e^{j\frac{2\pi n}{M}},$$

the M is a positive integer, the n is a non-negative integer less than the M, $\theta_1$ and $\theta_2$ of at least one precoding matrix in the codebook are different, and the first antenna group and the second antenna group belong to a same multi-antenna system; and a sending unit, configured to send a precoding matrix indicator PMI to the transmit end, so that the transmit end determines the W according to the PMI.

According to a fourth aspect, a transmit end is provided, where the transmit end includes: a receiving unit, configured to receive a precoding matrix indicator PMI sent by a receive end; and a determining unit, configured to determine, according to the precoding matrix indicator PMI received by the receiving unit, a precoding matrix W that is selected by the receive end from a codebook based on a reference signal, where the $$W \in \begin{bmatrix} X_1(\theta_1) \\ X_2(\theta_2, \varphi_n) \end{bmatrix},$$

a matrix $X_1$ is determined according to $\theta_1$, a matrix $X_2$ is determined according to $\theta_2$ and $\phi_n$, the $\theta_1$ indicates a phase difference of weighted values for signal transmission between two neighboring antennas in a first antenna group of the transmit end, where the signal transmission between the two neighboring antennas in the first antenna group is for a same transmission layer, the $\theta_2$ indicates a phase difference of weighted values for signal transmission between two neighboring antennas in a second antenna group of the transmit end, where the signal transmission between the two neighboring antennas in the second antenna group is for the same transmission layer, the $\phi_n$ indicates a phase difference of weighted values for signal transmission between the first antenna group and the second antenna group, where the signal transmission between the first antenna group and the second antenna group is for a same transmission layer, the $$\varphi_n = e^{j\frac{2\pi n}{M}},$$

the M is a positive integer, the n is a non-negative integer less than the M, $\theta_1$ and $\theta_2$ of at least one precoding matrix in the codebook are different, and the first antenna group and the second antenna group belong to a same multi-antenna system.

According to a fifth aspect, a receive end is provided, where the receive end includes: a processor, configured to select a precoding matrix W from a codebook based on a reference signal, where the $$W \in \begin{bmatrix} X_1(\theta_1) \\ X_2(\theta_2, \varphi_n) \end{bmatrix},$$

a matrix $X_1$ is determined according to $\theta_1$, a matrix $X_2$ is determined according to $\theta_2$ and $\phi_n$, the $\theta_1$ indicates a phase difference of weighted values for signal transmission between two neighboring antennas in a first antenna group of a transmit end, where the signal transmission between the two neighboring antennas in the first antenna group is for a same transmission layer, the $\theta_2$ indicates a phase difference of weighted values for signal transmission between two neighboring antennas in a second antenna group of the transmit end, where the signal transmission between the two neighboring antennas in the second antenna group is for the same transmission layer, the $\phi_n$ indicates a phase difference of weighted values for signal transmission between the first antenna group and the second antenna group, where the signal transmission between the first antenna group and the second antenna group is for a same transmission layer, the $$\varphi_n = e^{j\frac{2\pi n}{M}},$$

M is a positive integer, n is a non-negative integer less than M, $\theta_1$ and $\theta_2$ of at least one precoding matrix in the codebook are different, and the first antenna group and the second antenna group belong to a same multi-antenna system; and a sender, configured to send a precoding matrix indicator PMI to the transmit end, so that the transmit end determines, according to the PMI, the W selected by the processor.

According to a sixth aspect, a transmit end is provided, where the transmit end includes: a receiver, configured to receive a precoding matrix indicator PMI sent by a receive end; and a processor, configured to determine, according to the precoding matrix indicator PMI received by the receiver, a precoding matrix W that is selected by the receive end from a codebook based on a reference signal, where the $$W \in \begin{bmatrix} X_1(\theta_1) \\ X_2(\theta_2, \varphi_n) \end{bmatrix},$$

a matrix $X_1$ is determined according to $\theta_1$, a matrix $X_2$ is determined according to $\theta_2$ and $\varphi_n$, the $\theta_1$ indicates a phase difference of weighted values for signal transmission between two neighboring antennas in a first antenna group of the transmit end, where the signal transmission between the two neighboring antennas in the first antenna group is for a same transmission layer, the $\theta_2$ indicates a phase difference of weighted values for signal transmission between two neighboring antennas in a second antenna group of the transmit end, where the signal transmission between the two neighboring antennas in the second antenna group is for the same transmission layer, the $\varphi_n$ indicates a phase difference of weighted values for signal transmission between the first antenna group and the second antenna group, where the signal transmission between the first antenna group and the second antenna group is for a same transmission layer, the $$\varphi_n = e^{\frac{j2\pi n}{M}},$$

the M is a positive integer, the n is a non-negative integer less than the M, $\theta_1$ and $\theta_2$ of at least one precoding matrix in the codebook are different, and the first antenna group and the second antenna group belong to a same multi-antenna system.

Based on the foregoing solutions, user equipment selects a precoding matrix W from a codebook based on a reference signal, where $$W \in \begin{bmatrix} X_1(\theta_1) \\ X_2(\theta_2, \varphi_n) \end{bmatrix},$$

and $\theta_1$ and $\theta_2$ are used to respectively indicate a phase difference between two neighboring antennas in a first antenna group and a phase difference between two neighboring antennas in a second antenna group. In this way, an appropriate precoding matrix may be selected according to an antenna spacing condition, to ensure a weak correlation between antennas, and therefore, a base station performs precoding based on the precoding matrix fed back by the user equipment and selected from a codebook structure of the present disclosure, to effectively improve the precoding precision, thereby reducing the performance loss, and improving the system throughput.

BRIEF DESCRIPTION OF DRAWINGS

To describe the technical solutions in the embodiments of the present disclosure more clearly, the following briefly introduces the accompanying drawings required for describing the embodiments of the present disclosure. Apparently, the accompanying drawings in the following description show merely some embodiments of the present disclosure, and a person of ordinary skill in the art may still derive other drawings from these accompanying drawings without creative efforts.

DESCRIPTION OF EMBODIMENTS

The following clearly describes the technical solutions in the embodiments of the present disclosure with reference to the accompanying drawings in the embodiments of the present disclosure. Apparently, the described embodiments are a part rather than all of the embodiments of the present disclosure. All other embodiments obtained by a person of ordinary skill in the art based on the embodiments of the present disclosure without creative efforts shall fall within the protection scope of the present disclosure.

It should be understood that the technical solutions of the present disclosure may be applied to various communications systems, such as: a Global System for Mobile Communications (GSM), a Code Division Multiple Access (CDMA) system, a Wideband Code Division Multiple Access (WCDMA) system, a general packet radio service (GPRS), a Long Term Evolution (LTE) system, a Long Term Evolution Advanced (A LTE-A) system, and a Universal Mobile Telecommunications System (UMTS).

It should further be understood that in the embodiments of the present disclosure, user equipment (UE) includes but is not limited to a mobile station (MS), a relay (Relay), a mobile terminal (Mobile Terminal), a mobile telephone (Mobile Telephone), a handset (handset), a portable equipment (portable equipment), and the like. The user equipment may communicate with one or more core networks by using a radio access network (RAN). For example, the user equipment may be a mobile telephone (or referred to as a "cellular" telephone), or a computer having a communication function; the user equipment may further be a portable, pocket-sized, handheld, computer built-in, or in-vehicle mobile apparatus.

In the embodiments of the present disclosure, a base station may be a base station (BTS) in GSM or CDMA, may also be a base station (NodeB, NB) in WCDMA, and may further be an evolved NodeB (eNB, or e-NodeB) in LTE, or a relay, which is not limited in the present disclosure.

Figure 1:
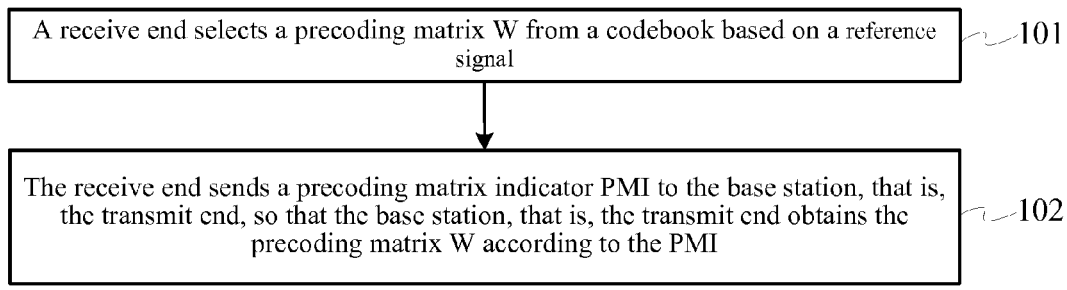
FIG. 1 is a flowchart of a method for feeding back a precoding matrix indicator according to an embodiment of the present disclosure.

FIG. 1 is a flowchart of a method for feeding back a precoding matrix indicator according to an embodiment of the present disclosure. The method is executed by a receive end.

101: A receive end selects a precoding matrix W from a codebook based on a reference signal, where the $$W \in \begin{bmatrix} X_1(\theta_1) \\ X_2(\theta_2, \varphi_n) \end{bmatrix},$$

a matrix $X_1$ is determined according to $\theta_1$, a matrix $X_2$ is determined according to $\theta_2$ and $\varphi_n$, $\theta_1$ indicates a phase difference of weighted values for signal transmission between two neighboring antennas in a first antenna group of a transmit end, where the signal transmission between the two neighboring antennas in the first antenna group is for a same transmission layer, $\theta_2$ indicates a phase difference of weighted values for signal transmission between two neighboring antennas in a second antenna group of the transmit end, where the signal transmission between the two neighboring antennas in the second antenna group is for the same transmission layer, $\phi_n$ indicates a phase difference of weighted values for signal transmission between the first antenna group and the second antenna group, where the signal transmission between the first antenna group and the second antenna group is for a same transmission layer, $$\varphi_n = e^{\frac{j2\pi n}{M}},$$

M is a positive integer, n is a non-negative integer less than the M, $\theta_1$ and $\theta_2$ of at least one precoding matrix in the codebook are different, and the first antenna group and the second antenna group belong to a same multi-antenna system.

102: The receive end sends a precoding matrix indicator PMI to the transmit end, so that the transmit end obtains the precoding matrix W according to the PMI.

The multi-antenna system refers to a system in which the transmit end (such as a base station) and the receive end (such as UE) perform communication by using multiple antennas. Compared with a single-antenna system, multiple antennas of the transmit end and the receive end can form a spatial diversity gain or multiplexing gain, which can effectively improve the transmission reliability and the system capacity. The diversity gain and the multiplexing gain of the multi-antenna system may generally be obtained by using a precoding method of the transmit end and a receive signal combination algorithm of the receive end. For example, in an LTE system, a transmit end uses four antennas, and a receive end uses two antennas.

Additionally, the multi-antenna system of this embodiment of the present disclosure is also applicable to a scenario of multi-point joint transmission, and the multi-point joint transmission refers to that multiple transmit ends perform joint signal transmission for a same user, for example, a transmit end A has two antennas, a transmit end B also has two antennas, and the two transmit ends perform joint transmission for a receive end at the same time. Then, a signal received by the receive end may be considered as a signal sent by a 4-antenna base station.

Based on the foregoing solution, the receive end selects the precoding matrix W from the codebook based on the reference signal, where $$W \in \begin{bmatrix} X_1(\theta_1) \\ X_2(\theta_2, \varphi_n) \end{bmatrix},$$

and $\theta_1$ and $\theta_2$ respectively indicate the phase difference of the weighted values for the signal transmission between the two neighboring antennas in the first antenna group and the phase difference of the weighted values for the signal transmission between the two neighboring antennas in the second antenna group, where the signal transmission between the two neighboring antennas in the first antenna group and the signal transmission between the two neighboring antennas in the second antenna group are for the same transmission layer. In this way, an appropriate precoding matrix may be selected according to an antenna spacing condition, to ensure a weak correlation between antennas, and therefore, the transmit end performs precoding based on the precoding matrix fed back by the receive end and selected from a codebook structure of the present disclosure, to effectively improve the precoding precision, thereby reducing the performance loss, and improving the system throughput.

For ease of description, in the following embodiments, description is made by using an example in which a transmit end is a base station, description is made by using an example in which a receive end is UE, and it should be understood that this is not limited in this embodiment of the present disclosure, the receive end may be a base station, and the transmit end may be UE.

It should be noted that a type of the reference signal in 101 is not limited in this embodiment of the present disclosure. For example, the reference signal may be a channel state information reference signal (CSI RS), a demodulation reference signal (DM RS) or a cell-specific reference signal (CRS), and CSI may further include a channel quality indicator (CQI). It should be further noted that the UE may obtain a resource configuration of the reference signal by receiving notification (such as radio resource control (RRC) signaling or downlink control information (DCI)) of the base station or based on a cell identity (ID) and obtain the reference signal in a corresponding resource or subframe.

Optionally, in step 101, the receive end may obtain a channel estimation value based on the reference signal, and calculate a channel capacity or throughput or chordal distance based on the channel estimation value, and select the precoding matrix from the codebook according to a criterion pre-defined by the receive end, such as a channel capacity or throughput maximization criterion or a chordal distance minimization criterion.

Further, the receive end may further determine a rank indicator RI based on the reference signal, where the rank indicator RI is corresponding to a quantity of useful transmission layers. For example, the UE may obtain the RI based on a quantity of ports of the reference signal and a unique value of an allowable RI corresponding to a codebook subset limitation; or the UE obtains a channel estimation value based on the reference signal, and calculates a measurement value such as a channel capacity or a throughput based on the channel estimation value, a value for each allowable rank indicator RI, and a corresponding precoding matrix; and selects a rank indicator RI enabling the measurement value to be optimal to serve as a determined rank indicator RI. In step 101, the receive end may select the precoding matrix W corresponding to the rank indicator from the codebook based on the reference signal. Specifically, a codebook subset corresponding to the rank indicator may be determined from the codebook, and then the precoding matrix W is selected from the codebook subset; the precoding matrix W may be further determined directly by using the rank indicator.

Optionally, the codebook subset may be pre-defined, or the receive end reports the codebook to the transmit end, and the transmit end determines the codebook subset and notifies the receive end of the codebook subset; or the receive end determines and reports the codebook subset, for example, the codebook subset limitation may be notified by the base station to the UE by using high-layer signaling, such as RRC signaling. Optionally, in step 102, the UE may send the precoding matrix indicator PMI to the base station by using a physical uplink control channel (PUCCH) or physical uplink shared channel (PUSCH). It should be understood that this is not limited in this embodiment of the present disclosure.

Moreover, the precoding matrix indicator PMI and the rank indicator RI may be sent in a same subframe, and may also be sent in different subframes.

It should be understood that the matrix $X_1$ may be further determined according to $\theta_1$ and other factors (such as an amplitude), that is, $X_1$ is determined according to at least $\theta_1$; similarly, the matrix $X_2$ is determined according to at least $\theta_2$ and $\phi_n$, and this is not limited in the present disclosure.

Optionally, as an embodiment, in step 101, the precoding matrix W and the rank indicator are corresponding to each other, and the rank indicator is corresponding to a quantity of useful transmission layers. When the rank indicator is greater than or equal to 2, $\theta_1$ and $\theta_2$ may respectively indicate a phase difference of weighted values for signal transmission between two neighboring antennas in the first antenna group and a phase difference of weighted values for signal transmission between two neighboring antennas in the second antenna group, where the signal transmission between the two neighboring antennas in the first antenna group and the signal transmission between the two neighboring antennas in the second antenna group are for any transmission layer of multiple transmission layers.

Specifically, in a scenario of four antennas, when the rank indicator is 1, the precoding matrix may be:

$$W \in \begin{bmatrix} X_1(\theta_1) \\ X_2(\theta_2, \varphi_n) \end{bmatrix} = \alpha \begin{bmatrix} \begin{pmatrix} 1 \\ e^{j\theta_1} \end{pmatrix} \\ \varphi_n \begin{pmatrix} 1 \\ e^{j\theta_2} \end{pmatrix} \end{bmatrix} \quad (1)$$

or when the rank indicator is 2, the precoding matrix may be:

$$W \in \begin{bmatrix} X(\theta_1) \\ X(\theta_2, \varphi_n) \end{bmatrix} = \beta \begin{bmatrix} \begin{pmatrix} 1 \\ e^{j\theta_1} \end{pmatrix} & \begin{pmatrix} 1 \\ e^{j\theta_1} \end{pmatrix} \\ \varphi_n \begin{pmatrix} 1 \\ e^{j\theta_2} \end{pmatrix} & -\varphi_n \begin{pmatrix} 1 \\ e^{j\theta_2} \end{pmatrix} \end{bmatrix} \quad (2)$$

where $\alpha$ and $\beta$ are both constants; optionally, $\alpha=\frac{1}{2}$ and $$\beta = \frac{1}{\sqrt{8}}.$$

The foregoing example is merely exemplary, and is not intended to limit the scope of the present disclosure, and the codebook in the present disclosure may further be a codebook whose rank indicator is another value. For ease of description, in the present disclosure, description is made by using a codebook with a rank indicator of 1 and a codebook with a rank indicator of 2 as an example, and it should be understood that this is not limited in the present disclosure.

It should be further understood that the foregoing codebook is indicated in a form of a single-codebook structure, and certainly, may also be indicated in a form of a double-codebook structure, and this is not limited in the present disclosure.

Preferably, in this embodiment of the present disclosure, description is made by using a scenario of four antennas as an example, the four antennas are divided into two antenna groups, and each group includes two antennas. It should be understood that this is not limited in this embodiment of the present disclosure, for example, this embodiment of the present disclosure may be further applied to a scenario of eight antennas.

Specifically, in the scenario of eight antennas, each antenna group of two antenna groups may include four antennas, where when the rank indicator is 1, the precoding matrix may be:

$$W \in \begin{bmatrix} X_1(\theta_1) \\ X_2(\theta_2, \varphi_n) \end{bmatrix} = \alpha_2 \begin{bmatrix} \begin{pmatrix} 1 \\ e^{j\theta_1} \\ e^{j2\theta_1} \\ e^{j3\theta_1} \end{pmatrix} \\ \varphi_n \begin{pmatrix} 1 \\ e^{j\theta_2} \\ e^{j2\theta_2} \\ e^{j3\theta_2} \end{pmatrix} \end{bmatrix};$$

or when the rank indicator is 2, the precoding matrix may be:

$$W \in \begin{bmatrix} X(\theta_1) \\ X(\theta_2, \varphi_n) \end{bmatrix} = \beta_2 \begin{bmatrix} \begin{pmatrix} 1 \\ e^{j\theta_1} \\ e^{j2\theta_1} \\ e^{j3\theta_1} \end{pmatrix} & \begin{pmatrix} 1 \\ e^{j\theta_1} \\ e^{j2\theta_1} \\ e^{j3\theta_1} \end{pmatrix} \\ \varphi_n \begin{pmatrix} 1 \\ e^{j\theta_2} \\ e^{j2\theta_2} \\ e^{j3\theta_2} \end{pmatrix} & -\varphi_n \begin{pmatrix} 1 \\ e^{j\theta_2} \\ e^{j2\theta_2} \\ e^{j3\theta_2} \end{pmatrix} \end{bmatrix}.$$

For ease of description, in the following example, description is made by using the scenario of four antennas as an example.

Optionally, in an implementation manner, that the rank indicator is 1 or 2 is used as an example, where when the rank indicator is 1, the precoding matrix:

$$W \in \alpha \begin{bmatrix} \begin{pmatrix} 1 \\ e^{j\theta_1} \end{pmatrix} \\ \varphi_n \begin{pmatrix} 1 \\ e^{j\theta_2} \end{pmatrix} \end{bmatrix} = \quad (3)$$

$$\alpha W_1 \cdot W_2^2 = \alpha \begin{bmatrix} X & 0 \\ 0 & X \end{bmatrix} \cdot W_2^1 = \alpha \begin{bmatrix} X & 0 \\ 0 & X \end{bmatrix} \cdot \begin{bmatrix} Y_1 \\ \varphi_n Y_2 \end{bmatrix}$$

or when the rank indicator is 2, the precoding matrix:

$$W \in \beta \begin{bmatrix} \begin{pmatrix} 1 \\ e^{j\theta_1} \end{pmatrix} & \begin{pmatrix} 1 \\ e^{j\theta_1} \end{pmatrix} \\ \varphi_n \begin{pmatrix} 1 \\ e^{j\theta_2} \end{pmatrix} & -\varphi_n \begin{pmatrix} 1 \\ e^{j\theta_2} \end{pmatrix} \end{bmatrix} = \quad (4)$$

$$\beta W_1 \cdot W_2^2 = \beta \begin{bmatrix} X & 0 \\ 0 & X \end{bmatrix} \cdot W_2^2 = \beta \begin{bmatrix} X & 0 \\ 0 & X \end{bmatrix} \cdot \begin{bmatrix} Y_1 & Y_1 \\ \varphi_n Y_2 & -\varphi_n Y_2 \end{bmatrix}$$

where $$X = \begin{bmatrix} 1 & 1 & & 1 \\ e^{j2\pi \frac{m}{N}} & e^{j2\pi \frac{m+1}{N}} & \cdots & e^{j2\pi \frac{m-(P-1)}{N}} \end{bmatrix} \quad (5)$$

Y1 and Y2 are P×1-dimensional column selection vectors independent from each other, $N=2^k$, k is a non-negative integer, m is a non-negative integer less than N, and P is a positive integer less than N. That is, N is 2 raised to the power, and may be a value of 0, 2, 4, 8, ..., and the like, $m \in \{0, 1, \ldots, N-1\}$, and $P \in \{0, 1, \ldots, N-1\}$.

For example, a value of k is 4, that is, N=16, $m \in \{0, 1, \ldots, N-1\} = \{0, 1, \ldots, 15\}$, P=4, and each of Y1 and Y2 may be one of the following column vectors:

$$\begin{bmatrix} 1 \\ 0 \\ 0 \\ 0 \end{bmatrix}, \begin{bmatrix} 0 \\ 1 \\ 0 \\ 0 \end{bmatrix}, \begin{bmatrix} 0 \\ 0 \\ 1 \\ 0 \end{bmatrix} \text{ and } \begin{bmatrix} 0 \\ 0 \\ 0 \\ 1 \end{bmatrix}.$$

That is, $$Y_1 \in \left\{ \begin{bmatrix} 1 \\ 0 \\ 0 \\ 0 \end{bmatrix}, \begin{bmatrix} 0 \\ 1 \\ 0 \\ 0 \end{bmatrix}, \begin{bmatrix} 0 \\ 0 \\ 1 \\ 0 \end{bmatrix}, \begin{bmatrix} 0 \\ 0 \\ 0 \\ 1 \end{bmatrix} \right\}, Y_2 \in \left\{ \begin{bmatrix} 1 \\ 0 \\ 0 \\ 0 \end{bmatrix}, \begin{bmatrix} 0 \\ 1 \\ 0 \\ 0 \end{bmatrix}, \begin{bmatrix} 0 \\ 0 \\ 1 \\ 0 \end{bmatrix}, \begin{bmatrix} 0 \\ 0 \\ 0 \\ 1 \end{bmatrix} \right\},$$

and Y1 and Y2 may be the same or different.

Assume that $$Y_1 = \begin{bmatrix} 1 \\ 0 \\ 0 \\ 0 \end{bmatrix}, \begin{pmatrix} 1 \\ e^{j\theta_1} \end{pmatrix}$$

is a first column of the matrix X in the formula (5); assume that $$Y_2 = \begin{bmatrix} 0 \\ 1 \\ 0 \\ 0 \end{bmatrix}, \begin{pmatrix} 1 \\ e^{j\theta_2} \end{pmatrix}$$

is a second column of the matrix X in the formula (5).

Optionally, in step 102, the receive end may send a first precoding matrix indicator $PMI_1$ and a second precoding matrix indicator $PMI_2$ to the transmit end, that is, the precoding matrix indicator PMI includes $PMI_1$ and $PMI_2$. Further, $PMI_1$ and $PMI_2$ are sent in a same period of time or different periods of time. $PMI_1$ is used to indicate $W_1$, and $PMI_2$ is used to indicate $W_2^1$ or $W_2^2$. In other words, $PMI_1$ and $PMI_2$ may have a same time-domain or frequency-domain granularity or different time-domain or frequency-domain granularities (or be based on different subframe periods or subband sizes).

Optionally, $W_1$ is a matrix indicating a broadband channel characteristic, and both $W_2^1$ and $W_2^2$ are matrices indicating a subband channel characteristic, or, $W_1$ is a matrix indicating a long-term channel characteristic, and both $W_2^1$ and $W_2^2$ are matrices indicating a short-term channel characteristic. A digital of a superscript in $W_2$ indicates a value of a rank. Correspondingly, the receive end may send $PMI_1$ to the transmit end at a long time interval, and send $PMI_2$ to the transmit end at a short time interval.

Certainly, the receive end may directly indicate a selected precoding matrix W by using a PMI, for example, a codebook totally has 256 precoding matrices, and when the PMI sent by the receive end is 0, a first precoding matrix of the 256 precoding matrices is indicated to the transmit end; when the PMI sent by the receive end is 1, a second precoding matrix of the 256 precoding matrices is indicated to the transmit end, ..., that is, values 0 to 255 of the PMI are respectively corresponding to corresponding precoding matrices of the 256 precoding matrices. It should be understood that a manner of indicating a precoding matrix by the receive end is not limited in this embodiment of the present disclosure.

Optionally, the receive end may send a precoding matrix indicator PMI to the transmit end by using a physical control channel or physical shared channel. For example, the UE may send a precoding matrix indicator PMI to the base station by using a physical uplink control channel or physical uplink shared channel. It should be understood that this is not limited in this embodiment of the present disclosure.

Therefore, a column vector is selected independently from the matrix X separately by using the column selection vectors Y1 and Y2 in this embodiment of the present disclosure, thereby ensuring a weak correlation between codebooks corresponding to antennas with a large spacing.

Optionally, in another implementation manner, values of $\theta_1$ and $\theta_2$ may be respectively:

$$\theta_1 = \frac{2\pi}{N}(A \cdot i_1 + \lfloor i_2 / M \rfloor) \quad (6)$$

$$\theta_2 = \frac{2\pi}{N}(A \cdot i_1 + i_3) \quad (7)$$

where $N=2^k$, the k is a non-negative integer, A is a positive integer that can be divided exactly by N (for example, N=16, and A=2), M is a positive integer less than N, $i_1$ is a non-negative integer less than (N/A−1), both $i_2$ and $i_3$ are positive integers, $i_2$ and $i_3$ are independent from each other, and $\lfloor \cdot \rfloor$ is a round-down operation symbol. That is, N is 2 raised to the power, and may be a value of 0, 2, 4, 8, ..., and the like, $P \in \{0, 1, \ldots, N-1\}$, and $i_1 \in \{0, 1, \ldots, N/A-1\}$.

Optionally, in step 102, the receive end may send a third precoding matrix indicator $PMI_3$ and a fourth precoding matrix indicator $PMI_4$ to the transmit end, that is, the precoding matrix indicator PMI includes $PMI_3$ and $PMI_4$. Further, $PMI_3$ and $PMI_4$ are sent in a same period of time or different periods of time. $PMI_3$ is used to indicate $i_1$, and $PMI_4$ is used to indicate $i_2$ and $i_3$. Specifically, $PMI_4$ may be a joint coding value of $i_2$ and $i_3$. The transmit end may determine $i_2$ and $i_3$ by using a value of $PMI_4$ and a correspondence between $i_2$ and $i_3$. For example, the transmit end may preset a correspondence between $PMI_4$ and $i_2$, determine $i_2$ by using the value of $PMI_4$, and then determine $i_3$ according to a relation $PMI_4 = P \cdot i_2 + i_3$; similarly, the transmit end may preset a correspondence between $PMI_4$ and $i_3$, determine $i_3$ by using the value of $PMI_4$, and then determine $i_2$ according to a relation $PMI_4 = P \cdot i_2 + i_3$.

In other words, $PMI_3$ and $PMI_4$ may have different time-domain or frequency-domain granularities. Certainly, the receive end may directly indicate a selected precoding matrix W by using a PMI. For a specific implementation manner, reference may be made to the foregoing embodiment, and details are not described herein again.

It should be understood that a manner of indicating a precoding matrix by the receive end is not limited in this embodiment of the present disclosure.

Optionally, the receive end may send a precoding matrix indicator PMI to the transmit end by using a physical control channel or physical shared channel. It should be understood that this is not limited in this embodiment of the present disclosure.

Therefore, in this embodiment of the present disclosure, $\theta_1$ and $\theta_2$ may be selected independently according to a current channel characteristic by using $i_2$ and $i_3$ respectively, thereby ensuring a weak correlation between codebooks corresponding to antennas with a large spacing.

Optionally, in another implementation manner, values of $\theta_1$ and $\theta_2$ may also be respectively:

$$\theta_1 = \frac{2\pi}{N}\left(A \cdot i_1 + \left\lfloor \frac{i_2}{P \cdot M} \right\rfloor\right) \quad (8)$$

$$\theta_2 = \frac{2\pi}{N}\left(A \cdot i_1 + \left\lfloor \frac{(i_4 \mod(M \cdot P))}{M} \right\rfloor\right) \quad (9)$$

where $N=2^k$, k is a non-negative integer, A is a positive integer that can be divided exactly by N, P is a positive integer less than N, $i_1$ is a non-negative integer less than (N/A−1), $i_4$ is a positive integer less than (PM−1) (for example, P=4, M=4, and $i_4$<15), $\lfloor \cdot \rfloor$ is a round-down operation symbol, and mod is a modulo operation symbol. That is, N is 2 raised to the power, and may be a value of 0, 2, 4, 8, ..., and the like, P∈{0, 1, ..., N−1}, and $i_1$∈{0, 1, ..., N/A−1}.

Optionally, in step 102, the receive end may send a fifth precoding matrix indicator $PMI_5$ and a sixth precoding matrix indicator $PMI_6$ to the transmit end, that is, the precoding matrix indicator PMI includes $PMI_5$ and $PMI_2$. Further, $PMI_5$ and $PMI_6$ are sent in a same period of time or different periods of time. $PMI_5$ is used to indicate $i_1$, and $PMI_6$ is used to indicate $i_4$. In other words, $PMI_5$ and $PMI_6$ may have different time-domain or frequency-domain granularities. Certainly, the receive end may directly indicate a selected precoding matrix W by using a PMI. For a specific implementation manner, reference may be made to the foregoing embodiment, and details are not described herein again.

It should be understood that a manner of indicating a precoding matrix by the receive end is not limited in this embodiment of the present disclosure.

Optionally, the receive end may send a precoding matrix indicator PMI to the transmit end by using a physical control channel or physical shared channel. It should be understood that this is not limited in this embodiment of the present disclosure.

Therefore, in this embodiment of the present disclosure, $\theta_1$ and $\theta_2$ may be determined according to a current channel characteristic by using $i_4$, and $\theta_1$ and $\theta_2$ in the selected precoding matrix may be the same or different, thereby ensuring a weak correlation between codebooks corresponding to antennas with a large spacing.

Optionally, in another implementation manner, values of $\theta_1$ and $\theta_2$ may also be respectively:

$$\theta_1 = 2\pi \frac{m}{N} \quad (10)$$

$$\theta_2 = \theta_1 + \Delta\theta \quad (11)$$

where $N=2^k$, k is a non-negative integer, m is a non-negative integer less than N, $\Delta\theta = 2\pi t$, and an absolute value of t is less than 1, for example, t is ⅛, −1/16, −1/32, 0, 1/32, 1/16 or ⅛.

In step 101, the receive end may select a precoding matrix W from a codebook according to selection of $\theta_1$ and $\Delta\theta$ (such as a current channel characteristic).

Similarly, in step 102, the receive end may send two precoding matrix indicators to the transmit end, to indicate $\theta_1$ and $\Delta\theta$ respectively. Further, the two precoding matrix indicators may also be sent in a same period of time or different periods of time, and in other words, the two precoding matrix indicators may have different time-domain or frequency-domain granularities. Certainly, the receive end may directly indicate a selected precoding matrix W by using a PMI. For a specific implementation manner, reference may be made to the foregoing embodiment, and details are not described herein again.

It should be understood that a manner of indicating a precoding matrix by the receive end is not limited in this embodiment of the present disclosure.

Optionally, the receive end may send a precoding matrix indicator PMI to the transmit end by using a physical control channel or physical shared channel. It should be understood that this is not limited in this embodiment of the present disclosure.

Therefore, in this embodiment of the present disclosure, by using a phase offset $\Delta\theta$ between $\theta_1$ and $\theta_2$, $\Delta\theta$ may be controlled within a limited change range according to a current channel characteristic, thereby ensuring a weak correlation between codebooks corresponding to antennas with a large spacing.

Optionally, in another implementation manner, that the rank indicator is 1 or 2 is used as an example, where when the rank indicator is 1, the precoding matrix:

$$W \in \alpha \begin{bmatrix} \begin{pmatrix} 1 \\ e^{j\theta_1} \end{pmatrix} \\ \varphi_n \begin{pmatrix} 1 \\ e^{j\theta_2} \end{pmatrix} \end{bmatrix} = W_3 \cdot W_4^1 = \begin{bmatrix} X'_{m1} & 0 \\ 0 & DX'_{m1} \end{bmatrix} \cdot \frac{1}{2} \begin{bmatrix} Y \\ \varphi_n Y \end{bmatrix} \text{ or,} \quad (12)$$

$$W \in \alpha \begin{bmatrix} \begin{pmatrix} 1 \\ e^{j\theta_1} \end{pmatrix} \\ \varphi_n \begin{pmatrix} 1 \\ e^{j\theta_2} \end{pmatrix} \end{bmatrix} = W_3 \cdot W_4^1 = \begin{bmatrix} X'_{m1} & 0 \\ 0 & DX'_{m1} \end{bmatrix} \cdot \frac{1}{2} \begin{bmatrix} Y'_1 \\ \varphi_n Y'_2 \end{bmatrix} \quad (13)$$

where $$D = \begin{bmatrix} 1 & 0 \\ 0 & e^{j\theta'} \end{bmatrix}, n_1, n_2, \ldots, n_P$$

are all integers, and may be consecutive values or non-consecutive values, Y, $Y_1'$ and $Y_2'$ are all P×1-dimensional column selection vectors, $N=2^k$, k is a non-negative integer, m1 is a non-negative integer less than N, and P is a positive integer less than N. That is, N is 2 raised to the power, and may be a value of 0, 2, 4, 8, ..., and the like, m1∈{0, 1, ..., N−1}, and P∈{0, 1, ..., N−1}. For example, a value of k is 4, that is, N=16, m1∈{0, 1, ..., N−1}={0, 1, ..., 15}, α is a constant, and θ' is a real number.

Optionally, P=4, and each of Y, $Y_1'$ and $Y_2'$ may be one of the following column vectors:

$$\begin{bmatrix}1\\0\\0\\0\end{bmatrix}, \begin{bmatrix}0\\1\\0\\0\end{bmatrix}, \begin{bmatrix}0\\0\\1\\0\end{bmatrix} \text{ and } \begin{bmatrix}0\\0\\0\\1\end{bmatrix}.$$

That is, $$Y \in \left\{\begin{bmatrix}1\\0\\0\\0\end{bmatrix}, \begin{bmatrix}0\\1\\0\\0\end{bmatrix}, \begin{bmatrix}0\\0\\1\\0\end{bmatrix}, \begin{bmatrix}0\\0\\0\\1\end{bmatrix}\right\}, Y_1' \in \left\{\begin{bmatrix}1\\0\\0\\0\end{bmatrix}, \begin{bmatrix}0\\1\\0\\0\end{bmatrix}, \begin{bmatrix}0\\0\\1\\0\end{bmatrix}, \begin{bmatrix}0\\0\\0\\1\end{bmatrix}\right\},$$

$$Y_2' \in \left\{\begin{bmatrix}1\\0\\0\\0\end{bmatrix}, \begin{bmatrix}0\\1\\0\\0\end{bmatrix}, \begin{bmatrix}0\\0\\1\\0\end{bmatrix}, \begin{bmatrix}0\\0\\0\\1\end{bmatrix}\right\}.$$

Optionally, in step 102, the receive end may send a seventh precoding matrix indicator $PMI_7$ and an eighth precoding matrix indicator $PMI_8$ to the transmit end, that is, the precoding matrix indicator PMI includes $PMI_7$ and $PMI_8$. Further, $PMI_7$ and $PMI_8$ are sent in a same period of time or different periods of time. $PMI_5$ is used to indicate $W_3$, and $PMI_8$ is used to indicate $W_4^1$. In other words, $PMI_7$ and $PMI_8$ may have a same time-domain or frequency-domain granularity or different time-domain or frequency-domain granularities (or be based on different subframe periods or subband sizes).

Optionally, $W_3$ is a matrix indicating a broadband channel characteristic, and $W_4^1$ is a matrix indicating a subband channel characteristic, or $W_3$ is a matrix indicating a long-term channel characteristic, and $W_4^1$ is a matrix indicating a short-term channel characteristic. Correspondingly, the receive end may send $PMI_7$ to the transmit end at a long time interval, and send $PMI_8$ to the transmit end at a short time interval.

When the rank indicator is 2, the precoding matrix:

$$W \in \beta \begin{bmatrix} \begin{pmatrix}1\\e^{j\theta_1}\end{pmatrix} & \begin{pmatrix}1\\e^{j\theta_1}\end{pmatrix} \\ \varphi_n\begin{pmatrix}1\\e^{j\theta_2}\end{pmatrix} & -\varphi_n\begin{pmatrix}1\\e^{j\theta_2}\end{pmatrix} \end{bmatrix} = \quad (14)$$

$$W_3 \cdot W_4^2 = \begin{bmatrix} X_{m1}' & 0 \\ 0 & DX_{m1}' \end{bmatrix} \cdot \frac{1}{\sqrt{8}} \begin{bmatrix} Y_3 & Y_3 \\ \varphi_n Y_4 & -\varphi_n Y_4 \end{bmatrix}$$

$$X_{m1}' = \begin{bmatrix} 1 & 1 & & 1 \\ e^{j2\pi\frac{m1+n_1}{N}} & e^{j2\pi\frac{m1+n_2}{N}} & \cdots & e^{j2\pi\frac{m1+n_P}{N}} \end{bmatrix} \quad (15)$$

where $$D = \begin{bmatrix} 1 & 0 \\ 0 & e^{j\theta'} \end{bmatrix}, n_1, n_2, \ldots, n_P$$

are all integers, and may be consecutive values or non-consecutive values, $Y_3$ and $Y_4$ are all P×1-dimensional column selection vectors, $N=2^k$, k is a non-negative integer, m1 is a non-negative integer less than N, and P is a positive integer less than N. That is, N is 2 raised to the power, and may be a value of 0, 2, 4, 8, ..., and the like, m1∈{0, 1, ..., N−1}, and P∈{0, 1, ..., N−1}. For example, a value of k is 4, that is, N=16, m1∈{0, 1, ..., N−1}={0, 1, ..., 15}, β is a constant, and θ' is a real number.

Alternatively, when the rank indicator is 2, the precoding matrix may further be:

$$W \in \beta \begin{bmatrix} \begin{pmatrix}1\\e^{j\theta_1}\end{pmatrix} & \begin{pmatrix}1\\e^{j\theta_3}\end{pmatrix} \\ \varphi_n\begin{pmatrix}1\\e^{j\theta_2}\end{pmatrix} & -\varphi_n\begin{pmatrix}1\\e^{j\theta_4}\end{pmatrix} \end{bmatrix} = \quad (16)$$

$$W_3 \cdot W_4^2 = \begin{bmatrix} X_{m1}' & 0 \\ 0 & DX_{m1}' \end{bmatrix} \cdot \frac{1}{\sqrt{8}} \begin{bmatrix} Y_3 & Y_3 \\ \varphi_n Y_4 & -\varphi_n Y_4 \end{bmatrix}$$

In the foregoing formula (16), $\theta_1$ specifically indicates a phase difference of weighted values for signal transmission between two neighboring antennas in the first antenna group of the transmit end, where the signal transmission between the two neighboring antennas in the first antenna group is for a first transmission layer of two transmission layers, $\theta_2$ specifically indicates a phase difference of weighted values for signal transmission between two neighboring antennas in the second antenna group of the transmit end, where the signal transmission between the two neighboring antennas in the second antenna group is for the first transmission layer of the two transmission layers, $\theta_3$ indicates a phase difference of weighted values for signal transmission between two neighboring antennas in the first antenna group of the transmit end, where the signal transmission between the two neighboring antennas in the first antenna group is for a second transmission layer of the two transmission layers, and $\theta_4$ indicates a phase difference of weighted values for signal transmission between two neighboring antennas in the second antenna group of the transmit end, where the signal transmission between the two neighboring antennas in the second antenna group is for the second transmission layer of the two transmission layers. Moreover, D, $Y_3$, $Y_4$ and $\varphi_n$ in the foregoing formula (16) enable two columns in any precoding matrix in a codebook set to be orthogonal to each other.

When the rank is 2, $Y_3$ and $Y_4$ may be the same or different, and this is not limited in this embodiment of the present disclosure.

It should be pointed out that, θ' may be any real number, a value of θ' is not limit in this embodiment of the present disclosure, for example, the value of θ' may be 0 or an integer multiple of 2π, such as, $$D = \begin{bmatrix} 1 & 0 \\ 0 & e^{j2\pi\frac{l}{N}} \end{bmatrix} \text{ or } D = \begin{bmatrix} 1 & 0 \\ 0 & e^{-j2\pi\frac{l}{N}} \end{bmatrix} \cdot l$$

may be a positive number and not an integer multiple of 2π, or may further be a negative number and not an integer multiple of 2π. For example, $$D = \begin{bmatrix} 1 & 0 \\ 0 & e^{j2\pi \frac{t}{N}} \end{bmatrix} \text{ or } D = \begin{bmatrix} 1 & 0 \\ 0 & e^{-j2\pi \frac{t}{N}} \end{bmatrix} \cdot l$$

is a positive integer and not an integer multiple of N.

Optionally, P=4, and each of $Y_3$ and $Y_4$ may be one of the following column vectors:

$$\begin{bmatrix} 1 \\ 0 \\ 0 \\ 0 \end{bmatrix}, \begin{bmatrix} 0 \\ 1 \\ 0 \\ 0 \end{bmatrix}, \begin{bmatrix} 0 \\ 0 \\ 1 \\ 0 \end{bmatrix} \text{ and } \begin{bmatrix} 0 \\ 0 \\ 0 \\ 1 \end{bmatrix}.$$

That is, $$Y_3 \in \left\{ \begin{bmatrix} 1 \\ 0 \\ 0 \\ 0 \end{bmatrix}, \begin{bmatrix} 0 \\ 1 \\ 0 \\ 0 \end{bmatrix}, \begin{bmatrix} 0 \\ 0 \\ 1 \\ 0 \end{bmatrix}, \begin{bmatrix} 0 \\ 0 \\ 0 \\ 1 \end{bmatrix} \right\}, Y_4 \in \left\{ \begin{bmatrix} 1 \\ 0 \\ 0 \\ 0 \end{bmatrix}, \begin{bmatrix} 0 \\ 1 \\ 0 \\ 0 \end{bmatrix}, \begin{bmatrix} 0 \\ 0 \\ 1 \\ 0 \end{bmatrix}, \begin{bmatrix} 0 \\ 0 \\ 0 \\ 1 \end{bmatrix} \right\}.$$

Optionally, in step 102, the receive end may send a ninth precoding matrix indicator $PMI_9$ and a tenth precoding matrix indicator $PMI_{10}$ to the transmit end, that is, the precoding matrix indicator PMI includes $PMI_9$ and $PMI_{10}$. Further, $PMI_9$ and $PMI_{10}$ are sent in a same period of time or different periods of time. $PMI_9$ is used to indicate $W_3$, and $PMI_{10}$ is used to indicate $W_4^2$. In other words, $PMI_9$ and $PMI_{10}$ may have a same time-domain or frequency-domain granularity or different time-domain or frequency-domain granularities (or be based on different subframe periods or subband sizes).

Optionally, $W_3$ is a matrix indicating a broadband channel characteristic, and $W_4^2$ is a matrix indicating a subband channel characteristic, or $W_3$ is a matrix indicating a long-term channel characteristic, and $W_4^2$ is a matrix indicating a short-term channel characteristic. Correspondingly, the receive end may send $PMI_9$ to the transmit end at a long time interval, and send $PMI_{10}$ to the transmit end at a short time interval.

Certainly, the receive end may directly indicate a selected precoding matrix W by using a PMI. For a specific implementation manner, reference may be made to the foregoing embodiment, and details are not described herein again.

It should be understood that a manner of indicating a precoding matrix by the receive end is not limited in this embodiment of the present disclosure.

Optionally, the receive end may send a precoding matrix indicator PMI to the transmit end by using a physical control channel or physical shared channel. It should be understood that this is not limited in this embodiment of the present disclosure.

Therefore, θ' is selected in this embodiment of the present disclosure, thereby ensuring a weak correlation between codebooks corresponding to antennas with a large spacing.

It should be pointed out that, manners of denoting the foregoing codebook (or precoding matrix) by using other equivalent matrices all fall within the scope of the present disclosure. For example, the precoding matrix obtained after the precoding matrix W in this embodiment of the present disclosure is subject to row or column displacement also falls within the scope of the present disclosure, for example, different antenna serial numbers correspondingly cause row displacement of the precoding matrix.

Figure 2:
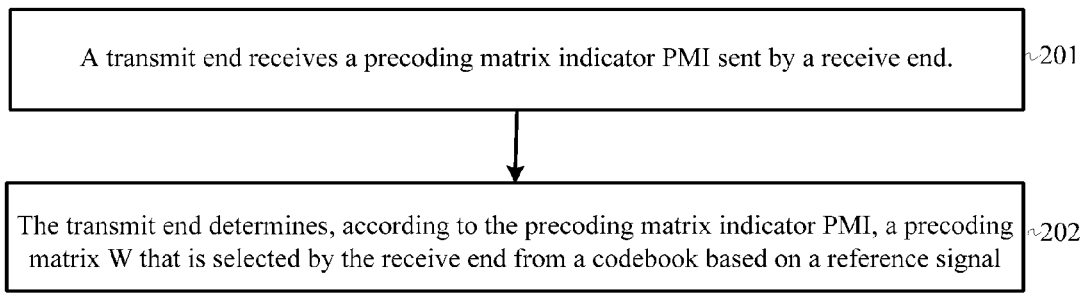
FIG. 2 is a flowchart of a method for receiving a precoding matrix indicator according to another embodiment of the present disclosure.

FIG. 2 is a flowchart of a precoding method according to another embodiment of the present disclosure. The method in FIG. 2 is executed by a transmit end, and is corresponding to the method in FIG. 1, and therefore the description repeated in the embodiment in FIG. 1 is properly omitted.

201: A transmit end receives a precoding matrix indicator PMI sent by a receive end.

202: The transmit end determines, according to the precoding matrix indicator PMI, a precoding matrix W that is selected by the receive end from a codebook based on a reference signal, where $$W \in \begin{bmatrix} X_1(\theta_1) \\ X_2(\theta_2, \varphi_n) \end{bmatrix},$$

a matrix $X_1$ is determined according to $\theta_1$, a matrix $X_2$ is determined according to $\theta_2$ and $\phi_n$, $\theta_1$ indicates a phase difference of weighted values for signal transmission between two neighboring antennas in a first antenna group of the transmit end, where the signal transmission between the two neighboring antennas in the first antenna group is for a same transmission layer, $\theta_2$ indicates a phase difference of weighted values for signal transmission between two neighboring antennas in a second antenna group of the transmit end, where the signal transmission between the two neighboring antennas in the second antenna group is for the same transmission layer, $\phi_n$ indicates a phase difference of weighted values for signal transmission between the first antenna group and the second antenna group, where the signal transmission between the first antenna group and the second antenna group is for a same transmission layer, $$\varphi_n = e^{\frac{j2\pi n}{M}}, M$$

is a positive integer, n is a non-negative integer less than M, $\theta_1$ and $\theta_2$ of at least one precoding matrix in the codebook are different, and the first antenna group and the second antenna group belong to a same multi-antenna system.

Based on the foregoing solution, a transmit end receives a precoding matrix indicator PMI sent by a receive end, and determines, according to the precoding matrix indicator PMI, a precoding matrix W that is selected by the receive end from a codebook based on a reference signal, where $$W \in \begin{bmatrix} X_1(\theta_1) \\ X_2(\theta_2, \varphi_n) \end{bmatrix},$$

and $\theta_1$ and $\theta_2$ respectively indicate the phase difference of the weighted values for the signal transmission between the two neighboring antennas in the first antenna group and the phase difference of the weighted values for the signal transmission between the two neighboring antennas in the second antenna group, where the signal transmission between the two neighboring antennas in the first antenna group and the signal transmission between the two neighboring antennas in the second antenna group are for the same transmission layer. In this way, an appropriate precoding matrix may be selected according to an antenna spacing condition, to ensure a weak correlation between antennas, and therefore, the transmit end performs precoding based on the precoding matrix fed back by the receive end and selected from a codebook structure of the present disclosure, to effectively improve the precoding precision, thereby reducing the performance loss, and improving the system throughput.

Optionally, the reference signal in step 202 may be a CSI RS, a DM RS or a CRS, and the CSI may further include a channel quality indicator CQI. It should be further noted that the UE may obtain a resource configuration of the reference signal by receiving a notification (such as RRC signaling or DCI) of the base station or based on a cell identity ID and obtain the reference signal in a corresponding resource or subframe.

Optionally, in step 201, the transmit end may receive, by using a physical control channel or physical shared channel, the precoding matrix indicator PMI sent by the receive end. For example, the base station may receive, by using a PUCCH or PUSCH, the precoding matrix indicator PMI sent by the UE. It should be understood that this is not limited in this embodiment of the present disclosure.

Preferably, this embodiment of the present disclosure is applied to a scenario of four antennas, the four antennas are divided into two antenna groups, and each group includes two antennas. It should be understood that this is not limited in this embodiment of the present disclosure, for example, this embodiments of the present disclosure may further be applied to a scenario of eight antennas, and for the form of a precoding matrix in the scenario of eight antennas, reference may be made to the foregoing description, and details are not described herein again. For ease of description, in the following example, description is made by using the scenario of four antennas as an example.

It should be understood that the matrix $X_1$ may be further determined according to $\theta_1$ and other factors, such as an amplitude, that is, $X_1$ is determined according to at least $\theta_1$; similarly, the matrix $X_2$ is determined according to at least $\theta_2$ and $\phi_n$, and this is not limited in the present disclosure.

Optionally, as an embodiment, a precoding matrix W and a rank indicator are corresponding to each other, the rank indicator is corresponding to a quantity of useful transmission layers, the rank indicator may be determined by the receive end, and for a specific example, reference may be made to the foregoing description, and details are not described herein again. Specifically, in a scenario of four antennas, a precoding matrix whose rank indicator is 1 may be the foregoing formula (1); or, a precoding matrix with a rank indicator of 2 may be the foregoing formula (2).

The foregoing example is merely exemplary, and is not intended to limit the scope of the present disclosure, and the codebook in the present disclosure may further be a codebook whose rank indicator is another value. For ease of description, in the present disclosure, description is made by using a codebook with a rank indicator of 1 and a codebook with a rank indicator of 2 as an example, and it should be understood that this is not limited in the present disclosure.

It should be further understood that the foregoing codebook is indicated in a form of a single-codebook structure, and certainly, may also be indicated in a form of a double-codebook structure, and this is not limited in the present disclosure.

Optionally, in an implementation manner, in step 202, that the rank indicator is 1 or 2 is used as an example, and when the rank indicator is 1, the precoding matrix determined by the transmit end may be the foregoing formula (3); or, when the rank indicator is 2, the precoding matrix determined by the transmit end may be the foregoing formula (4).

For example, a value of k is 4, that is, N=16, m∈{0, 1, ..., N−1}={0, 1, ..., 15}, P=4, and each of Y1 and Y2 may be one of the following column vectors:

$$\begin{bmatrix}1\\0\\0\\0\end{bmatrix}, \begin{bmatrix}0\\1\\0\\0\end{bmatrix}, \begin{bmatrix}0\\0\\1\\0\end{bmatrix} \text{ and } \begin{bmatrix}0\\0\\0\\1\end{bmatrix}.$$

That is, $$Y_1 \in \left\{\begin{bmatrix}1\\0\\0\\0\end{bmatrix}, \begin{bmatrix}0\\1\\0\\0\end{bmatrix}, \begin{bmatrix}0\\0\\1\\0\end{bmatrix}, \begin{bmatrix}0\\0\\0\\1\end{bmatrix}\right\}, Y_2 \in \left\{\begin{bmatrix}1\\0\\0\\0\end{bmatrix}, \begin{bmatrix}0\\1\\0\\0\end{bmatrix}, \begin{bmatrix}0\\0\\1\\0\end{bmatrix}, \begin{bmatrix}0\\0\\0\\1\end{bmatrix}\right\},$$

and Y1 and Y2 may be the same or different.

Assume that $$Y_1 = \begin{bmatrix}1\\0\\0\\0\end{bmatrix} \cdot \begin{pmatrix}1\\e^{j\theta_1}\end{pmatrix}$$

is a first column of the matrix X in the foregoing formula (5); assume that $$Y_2 = \begin{bmatrix}0\\1\\0\\0\end{bmatrix} \cdot \begin{pmatrix}1\\e^{j\theta_2}\end{pmatrix}$$

is a second column of the matrix X in the foregoing formula (5).

Optionally, in step 201, the transmit end receives a first precoding matrix indicator $PMI_1$ and a second precoding matrix indicator $PMI_2$ sent by the receive end, and the precoding matrix indicator PMI includes $PMI_1$ and $PMI_2$. Further, $PMI_1$ and $PMI_2$ sent by the receive end are received in a same period of time or different periods of time. In other words, $PMI_1$ and $PMI_2$ may have a same time-domain or frequency-domain granularity or different time-domain or frequency-domain granularities (or be based on different subframe periods or subband sizes). In step 202, the transmit end determines, according to $PMI_1$, the $W_1$ selected by the receive end from the codebook based on the reference signal, and determines, according to $PMI_2$, $W_2^1$ or $W_2^2$ selected by the UE from the codebook, and the transmit end may determine the precoding matrix W according to $W_1$ and $W_2^1$, or determine the precoding matrix W according to $W_1$ and $W_2^2$.

Optionally, $W_1$ is a matrix indicating a broadband channel characteristic, both $W_2^1$ and $W_2^2$ are matrices indicating a subband channel characteristic, and a digital of a superscript in $W_2$ indicates a value of a rank; or $W_1$ is a matrix indicating a long-term channel characteristic, and both $W_2^1$ and $W_2^2$ are matrices indicating a short-term channel characteristic. Correspondingly, the transmit end may receive, at a long time interval, $PMI_1$ sent by the receive end, and receive, at a short time interval, $PMI_2$ sent by the receive end.

Certainly, the transmit end may directly determine a selected precoding matrix W by using a PMI sent by the receive end. For example, a codebook totally has 256 precoding matrices, and when the PMI sent by the receive end and received by the transmit end is 0, the transmit end determines that what is selected by the receive end is a first precoding matrix of the 256 precoding matrices of the codebook, and when the PMI sent by the receive end and received by the transmit end is 1, the transmit end determines that what is selected by the receive end is a second precoding matrix of the 256 precoding matrices of the codebook, . . . , that is, values 0 to 255 of the PMI are respectively corresponding to corresponding precoding matrices of the 256 precoding matrices. It should be understood that a manner in which the UE indicates a precoding matrix is not limited in this embodiment of the present disclosure.

It should be understood that a manner of indicating a precoding matrix by the receive end is not limited in this embodiment of the present disclosure.

Optionally, the transmit end may receive, by using a physical control channel or physical shared channel, the precoding matrix indicator PMI sent by the receive end. It should be understood that this is not limited in this embodiment of the present disclosure.

Therefore, a column vector is selected independently from the matrix X separately by using the column selection vectors Y1 and Y2 in this embodiment of the present disclosure, thereby ensuring a weak correlation between codebooks corresponding to antennas with a large spacing.

Optionally, in another implementation manner, values of $\theta_1$ and $\theta_2$ may be $$\theta_1 = \frac{2\pi}{N}(A \cdot i_1 + \lfloor i_2/M \rfloor) \text{ and } \theta_2 = \frac{2\pi}{N}(A \cdot i_1 + i_3)$$

respectively, where $N=2^k$, the k is a non-negative integer, A is a positive integer that can be divided exactly by N (for example, N=16, and A=2), M is a positive integer less than N, $i_1$ is a non-negative integer less than (N/A−1), both $i_2$ and $i_3$ are positive integers, $i_2$ and $i_3$ are independent from each other, and $\lfloor \cdot \rfloor$ is a round-down operation symbol. That is, N is 2 raised to the power, and may be a value of 0, 2, 4, 8, . . . , and the like, P∈{0, 1, . . . , N−1}, and $i_1$∈{0, 1, . . . , N/A−1}.

Optionally, in step 201, the transmit end receives a third precoding matrix indicator $PMI_3$ and a fourth precoding matrix indicator $PMI_4$ sent by the receive end. Further, $PMI_3$ and $PMI_4$ sent by the receive end are received in a same period of time or different periods of time. In step 202, the transmit end determines $i_1$ according to $PMI_3$, and determines $i_2$ and $i_3$ according to $PMI_4$. Specifically, $PMI_4$ may be a joint coding value of $i_2$ and $i_3$. The transmit end may determine $i_2$ and $i_3$ by using a value of $PMI_4$ and a correspondence between $i_2$ and $i_3$. For example, the transmit end may preset a correspondence between $PMI_4$ and $i_2$, determine $i_2$ by using the value of $PMI_4$, and then determine $i_3$ according to a relation $PMI_4=P \cdot i_2+i_3$; similarly, the transmit end may preset a correspondence between $PMI_4$ and $i_3$, determine $i_3$ by using the value of $PMI_4$, and then determine $i_2$ according to a relation $PMI_4=P \cdot i_2+i_3$.

In other words, $PMI_3$ and $PMI_4$ may have different time-domain or frequency-domain granularities. Certainly, the transmit end may directly determine a selected precoding matrix W by using a PMI sent by the receive end. For a specific implementation manner, reference may be made to the foregoing embodiment, and details are not described herein again.

It should be understood that a manner of indicating a precoding matrix by the receive end is not limited in this embodiment of the present disclosure.

Optionally, the transmit end may receive, by using a physical control channel or physical shared channel, the precoding matrix indicator PMI sent by the receive end. It should be understood that this is not limited in this embodiment of the present disclosure.

Therefore, in this embodiment of the present disclosure, $\theta_1$ and $\theta_2$ may be selected independently according to a current channel characteristic by using $i_2$ and $i_3$ respectively, thereby ensuring a weak correlation between codebooks corresponding to antennas with a large spacing.

Optionally, in another implementation manner, values of $\theta_1$ and $\theta_2$ may also be $$\theta_1 = \frac{2\pi}{N}\left(A \cdot i_1 + \left\lfloor \frac{i_4}{P \cdot M} \right\rfloor\right) \text{ and } \theta_2 = \frac{2\pi}{N}\left(A \cdot i_1 + \left\lfloor \frac{(i_4 \bmod(M \cdot P))}{M} \right\rfloor\right)$$

respectively, where $N=2^k$, k is a non-negative integer, A is a positive integer that can be divided exactly by N, P is a positive integer less than N, $i_1$ is a non-negative integer less than (N/A−1), $i_4$ is a positive integer less than (PM−1) (for example, P=4, M=4, and $i_4$<15), $\lfloor \cdot \rfloor$ is a round-down operation symbol, and mod is a modulo operation symbol. That is, N is 2 raised to the power, and may be a value of 0, 2, 4, 8, . . . , and the like, P∈{0, 1, . . . , N−1}, and $i_1$∈{0, 1, . . . , N/A−1}.

Optionally, in step 201, the transmit end receives a fifth precoding matrix indicator $PMI_5$ and a sixth precoding matrix indicator $PMI_6$ sent by the receive end. Further, $PMI_5$ and $PMI_6$ sent by the receive end are received in a same period of time or different periods of time. In step 202, $i_1$ is determined according to $PMI_5$, and $i_4$ is determined according to $PMI_6$. In other words, $PMI_5$ and $PMI_6$ may have different time-domain or frequency-domain granularities. Certainly, the transmit end may directly determine a selected precoding matrix W by using a PMI sent by the receive end. For a specific implementation manner, reference may be made to the foregoing embodiment, and details are not described herein again.

It should be understood that a manner of indicating a precoding matrix by the receive end is not limited in this embodiment of the present disclosure.

Optionally, the transmit end may receive, by using a physical control channel or physical shared channel, the precoding matrix indicator PMI sent by the receive end. It should be understood that this is not limited in this embodiment of the present disclosure.

Therefore, in this embodiment of the present disclosure, $\theta_1$ and $\theta_2$ may be determined according to a current channel characteristic by using $i_4$, and $\theta_1$ and $\theta_2$ in the selected precoding matrix may be the same or different, thereby ensuring a weak correlation between codebooks corresponding to antennas with a large spacing.

Optionally, in another implementation manner, values of $\theta_1$ and $\theta_2$ may also be $$\theta_1 = 2\pi \frac{m}{N}$$

and $\theta_2=\theta_1+\Delta\theta$ respectively, where $N=2^k$, k is a non-negative integer, m is a non-negative integer less than N, $\Delta\theta=2\pi t$, and an absolute value of t is less than 1, for example, t is ⅛, −1/16, −1/32, 0, 1/32, 1/16 or ⅛.

Similarly, in step 201, the transmit end may receive two precoding matrix indicators sent by the receive end, and the two precoding matrix indicators indicate $\theta_1$ and $\Delta\theta$ respectively. Further, the two precoding matrix indicators sent by the receive end may also be received in a same period of time or different periods of time, and in other words, the two precoding matrix indicators may have different time-domain or frequency-domain granularities. The transmit end may determine the precoding matrix W by using $\theta_1$ and $\Delta\theta$. Certainly, the transmit end may directly determine, by using a PMI sent by the receive end, a precoding matrix W selected by the receive end. For a specific implementation manner, reference may be made to the foregoing embodiment, and details are not described herein again.

It should be understood that a manner of indicating a precoding matrix by the receive end is not limited in this embodiment of the present disclosure.

Optionally, the transmit end may receive, by using a physical control channel or physical shared channel, the precoding matrix indicator PMI sent by the receive end. It should be understood that this is not limited in this embodiment of the present disclosure.

Therefore, in this embodiment of the present disclosure, by using a phase offset $\theta_1$ between $\theta_2$ and $\Delta\theta$, $\Delta\theta$ may be controlled within a limited change range according to a current channel characteristic, thereby ensuring a weak correlation between codebooks corresponding to antennas with a large spacing.

Optionally, in an implementation manner, in step 202, when the rank indicator is 1, the precoding matrix determined by the transmit end may be the foregoing formula (12) or (13).

Similarly, in step 201, the transmit end may receive two precoding matrix indicators: a seventh precoding matrix indicator $PMI_7$ and an eighth precoding matrix indicator $PMI_8$ sent by the receive end, and the two precoding matrix indicators indicate $PMI_7$ and $PMI_8$ respectively. Further, the two precoding matrix indicators sent by the receive end may also be received in a same period of time or different periods of time, and in other words, the two precoding matrix indicators may have different time-domain or frequency-domain granularities. In step 202, the transmit end determines, according to $PMI_7$, $W_3$ selected by the receive end from the codebook based on the reference signal, and determines, according to $PMI_8$, $W_4^1$ selected by the UE from the codebook, and the transmit end may determine the precoding matrix W according to $W_3$ and $W_4^1$.

Optionally, $W_3$ is a matrix indicating a broadband channel characteristic, and $W_4^1$ is a matrix indicating a subband channel characteristic, or $W_3$ is a matrix indicating a long-term channel characteristic, and $W_4^1$ is a matrix indicating a short-term channel characteristic. Correspondingly, the receive end may send $PMI_7$ to the transmit end at a long time interval, and send $PMI_8$ to the transmit end at a short time interval.

When the rank indicator is 2, the precoding matrix determined by the transmit end may be the foregoing formula (14) or (16).

Similarly, in step 201, the transmit end may receive two precoding matrix indicators: a ninth precoding matrix indicator $PMI_9$ and a tenth precoding matrix indicator $PMI_{10}$ sent by the receive end, and the two precoding matrix indicators indicate $PMI_9$ and $PMI_{10}$ respectively. Further, the two precoding matrix indicators sent by the receive end may also be received in a same period of time or different periods of time, and in other words, the two precoding matrix indicators may have different time-domain or frequency-domain granularities. In step 202, the transmit end determines, according to $PMI_9$, $W_3$ selected by the receive end from the codebook based on the reference signal, and determines, according to $PMI_{10}$, $W_4^2$ selected by the UE from the codebook, and the transmit end may determine the precoding matrix W according to $W_3$ and $W_4^2$.

Certainly, the transmit end may directly determine, by using a PMI sent by the receive end, a precoding matrix W selected by the receive end. For a specific implementation manner, reference may be made to the foregoing embodiment, and details are not described herein again.

It should be understood that a manner of indicating a precoding matrix by the receive end is not limited in this embodiment of the present disclosure.

Optionally, the transmit end may receive, by using a physical control channel or physical shared channel, the precoding matrix indicator PMI sent by the receive end. It should be understood that this is not limited in this embodiment of the present disclosure.

Therefore, $\theta'$ is selected in this embodiment of the present disclosure, thereby ensuring a weak correlation between codebooks corresponding to antennas with a large spacing.

It should be pointed out that, manners of denoting the foregoing codebook (or precoding matrix) by using other equivalent matrices all fall within the scope of the present disclosure. For example, the precoding matrix obtained after the precoding matrix W in this embodiment of the present disclosure is subject to row or column displacement also falls within the scope of the present disclosure, for example, different antenna serial numbers correspondingly cause row displacement of the precoding matrix.

Figure 3:
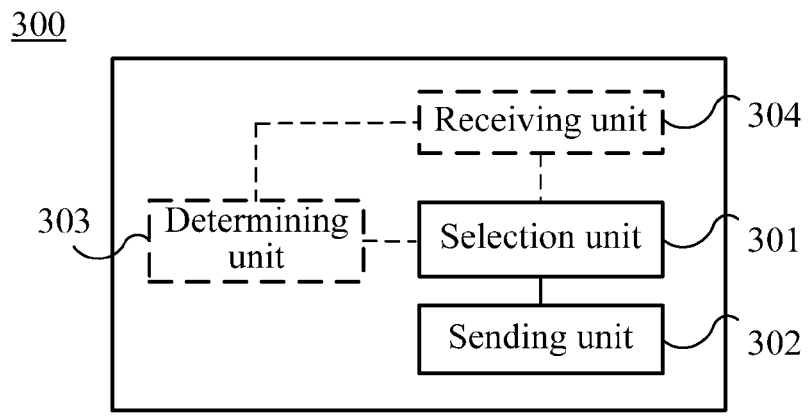
FIG. 3 is a structural block diagram of a receive end according to an embodiment of the present disclosure.

FIG. 3 is a structural block diagram of a receive end according to an embodiment of the present disclosure. The receive end 300 includes a selection unit 301 and a sending unit 302.

The selection unit 301 is configured to select a precoding matrix W from a codebook based on a reference signal, where the $$W \in \begin{bmatrix} X_1(\theta_1) \\ X_2(\theta_2, \varphi_n) \end{bmatrix},$$

a matrix $X_1$ is determined according to $\theta_1$, a matrix $X_2$ is determined according to $\theta_2$ and $\varphi_n$, $\theta_1$ indicates a phase difference of weighted values for signal transmission between two neighboring antennas in a first antenna group of a transmit end, where the signal transmission between the two neighboring antennas in the first antenna group is for a same transmission layer, $\theta_2$ indicates a phase difference of weighted values for signal transmission between two neighboring antennas in a second antenna group of the transmit end, where the signal transmission between the two neighboring antennas in the second antenna group is for the same transmission layer, $\varphi_n$ indicates a phase difference of weighted values for signal transmission between the first antenna group and the second antenna group, where the signal transmission between the first antenna group and the second antenna group is for a same transmission layer, $$\varphi_n = e^{\frac{j2\pi n}{M}},$$

M is a positive integer, n is a non-negative integer less than the M, $\theta_1$ and $\theta_2$ of at least one precoding matrix in the codebook are different, and the first antenna group and the second antenna group belong to a same multi-antenna system.

The sending unit 302 is configured to send a precoding matrix indicator PMI to the transmit end, so that the transmit end determines, according to the PMI, the precoding matrix W selected by the selection unit 301.

The multi-antenna system refers to a system in which the transmit end and the receive end perform communication by using multiple antennas. Compared with a single-antenna system, multiple antennas of the transmit end and the receive end can form a spatial diversity gain or multiplexing gain, which can effectively improve the transmission reliability and the system capacity. The diversity gain and the multiplexing gain of the multi-antenna system may generally be obtained by using a precoding method of the transmit end and a receive signal combination algorithm of the receive end. For example, in an LTE system, a transmit end uses four antennas, and a receive end uses two antennas.

Additionally, the multi-antenna system of this embodiment of the present disclosure is also applicable to a scenario of multi-point joint transmission, and the multi-point joint transmission refers to that multiple transmit ends perform joint signal transmission for a same user, for example, a transmit end A has two antennas, a transmit end B also has two antennas, and the two transmit ends perform joint transmission for a receive end at the same time. Then, a signal received by the receive end may be considered as a signal sent by a 4-antenna base station.

Based on the foregoing solution, the receive end selects the precoding matrix W from the codebook based on the reference signal, where $$W \in \begin{bmatrix} X_1(\theta_1) \\ X_2(\theta_2, \varphi_n) \end{bmatrix},$$

and $\theta_1$ and $\theta_2$ respectively indicate the phase difference of the weighted values for the signal transmission between the two neighboring antennas in the first antenna group and the phase difference of the weighted values for the signal transmission between the two neighboring antennas in the second antenna group, where the signal transmission between the two neighboring antennas in the first antenna group and the signal transmission between the two neighboring antennas in the second antenna group are for the same transmission layer. In this way, an appropriate precoding matrix may be selected according to an antenna spacing condition, to ensure a weak correlation between antennas, and therefore, the transmit end performs precoding based on the precoding matrix fed back by the receive end and selected from a codebook structure of the present disclosure, to effectively improve the precoding precision, thereby reducing the performance loss, and improving the system throughput.

In this embodiment of the present disclosure, the transmit end may be a base station, and correspondingly, the receive end may be UE; or the transmit end may be UE, and correspondingly, the receive end may be a base station. It should be understood that this is not limited in this embodiment of the present disclosure.

The receive end 300 may implement each step of the receive end involved in the method in FIG. 1 to FIG. 2, which is not described in detail again to avoid repetition.

Optionally, as an embodiment, the receive end 300 may further include a determining unit 303, and the determining unit 303 is configured to determine a rank indicator based on the reference signal, where the rank indicator is corresponding to a quantity of useful transmission layers. The selection unit 301 is specifically configured to select, from the codebook based on the reference signal, a precoding matrix W corresponding to the rank indicator determined by the determining unit 303.

Specifically, when the rank indicator determined by the determining unit 303 is 1, the precoding matrix selected by the selection unit 301 may be the foregoing formula (1); or, when the rank indicator determined by the determining unit 303 is 2, the precoding matrix selected by the selection unit 301 may be the foregoing formula (2).

The foregoing example is merely exemplary, and is not intended to limit the scope of the present disclosure, and the codebook in the present disclosure may further be a codebook whose rank indicator is another value. For ease of description, in the present disclosure, description is made by using a codebook with a rank indicator of 1 and a codebook with a rank indicator of 2 as an example, and it should be understood that this is not limited in the present disclosure.

It should be further understood that the foregoing codebook is indicated in a form of a single-codebook structure, and certainly, may also be indicated in a form of a double-codebook structure, and this is not limited in the present disclosure.

Optionally, in an implementation manner, that the rank indicator is 1 or 2 is used as an example, and when the rank indicator determined by the determining unit 303 is 1, the precoding matrix selected by the selection unit 301 may be the foregoing formula (3); or, when the rank indicator determined by the determining unit 303 is 2, the precoding matrix selected by the selection unit 301 may be the foregoing formula (4). For a specific example, reference may be made to the foregoing description, and details are not described herein again.

Optionally, $W_1$ is a matrix indicating a broadband channel characteristic, both $W_2^1$ and $W_2^2$ are matrices indicating a subband channel characteristic, and a digital of a superscript in $W_2$ indicates a value of a rank; or $W_1$ is a matrix indicating a long-term channel characteristic, and both $W_2^1$ and $W_2^2$ are matrices indicating a short-term channel characteristic.

Optionally, the precoding matrix indicator PMI sent by the sending unit 302 may include a first precoding matrix indicator $PMI_1$ and a second precoding matrix indicator $PMI_2$, $PMI_1$ is used to indicate $W_1$, and $PMI_2$ is used to indicate $W_2^1$ or $W_2^2$. Correspondingly, the transmit end may receive, at a long time interval, $PMI_1$ sent by the sending unit 302, and receive, at a short time interval, $PMI_2$ sent by the sending unit 302.

Therefore, a column vector is selected independently from the matrix X separately by using the column selection vectors Y1 and Y2 in this embodiment of the present disclosure, thereby ensuring a weak correlation between codebooks corresponding to antennas with a large spacing.

Optionally, in another implementation manner, when the rank indicator determined by the determining unit 303 is 1, the precoding matrix selected by the selection unit 301 may be the foregoing formula (12) or (13), and for a specific example, reference may be made to the foregoing description, and details are not described herein again.

Optionally, $W_3$ is a matrix indicating a broadband channel characteristic, and $W_4^1$ is a matrix indicating a subband channel characteristic, or $W_3$ is a matrix indicating a long-term channel characteristic, and $W_4^1$ is a matrix indicating a short-term channel characteristic.

Optionally, the precoding matrix indicator PMI sent by the sending unit 302 may include a seventh precoding matrix indicator $PMI_7$ and an eighth precoding matrix indicator $PMI_8$, $PMI_7$ is used to indicate $W_3$, and $PMI_8$ is used to indicate $W_4^1$. In other words, $PMI_7$ and $PMI_8$ may have a same time-domain or frequency-domain granularity or different time-domain or frequency-domain granularities (or be based on different subframe periods or subband sizes). Correspondingly, the transmit end may receive, at a long time interval, $PMI_7$ sent by the sending unit 302, and receive, at a short time interval, $PMI_8$ sent by the sending unit 302.

Optionally, in another implementation manner, when the rank indicator determined by the determining unit 303 is 2, the precoding matrix selected by the selection unit 301 may be the foregoing formula (14) or (16), and for a specific example, reference may be made to the foregoing description, and details are not described herein again.

Optionally, $W_3$ is a matrix indicating a broadband channel characteristic, and $W_4^2$ is a matrix indicating a subband channel characteristic, or $W_3$ is a matrix indicating a long-term channel characteristic, and $W_4^2$ is a matrix indicating a short-term channel characteristic.

Optionally, the precoding matrix indicator PMI sent by the sending unit 302 may include a ninth precoding matrix indicator $PMI_9$ and a tenth precoding matrix indicator $PMI_{10}$, $PMI_9$ is used to indicate $W_3$, and $PMI_{10}$ is used to indicate $W_4^2$. Correspondingly, the transmit end may receive, at a long time interval, $PMI_9$ sent by the sending unit 302, and receive, at a short time interval, $PMI_{10}$ sent by the sending unit 302.

Therefore, θ' is selected in this embodiment of the present disclosure, thereby ensuring a weak correlation between codebooks corresponding to antennas with a large spacing.

Optionally, in another implementation manner, values of $\theta_1$ and $\theta_2$ may be $$\theta_1 = \frac{2\pi}{N}(A \cdot i_1 + \lfloor i_2/M \rfloor) \text{ and } \theta_2 = \frac{2\pi}{N}(A \cdot i_1 + i_3)$$

respectively, where $N=2^k$, the k is a non-negative integer, A is a positive integer that can be divided exactly by N (for example, N=16, and A=2), M is a positive integer less than N, $i_1$ is a non-negative integer less than (N/A−1), both $i_2$ and $i_3$ are positive integers, $i_2$ and $i_3$ are independent from each other, and $\lfloor \cdot \rfloor$ is a round-down operation symbol. That is, N is 2 raised to the power, and may be a value of 0, 2, 4, 8, . . . , and the like, $P \in \{0, 1, \ldots, N-1\}$, and $i_1 \in \{0, 1, \ldots, N/A-1\}$.

Optionally, the precoding matrix indicator PMI sent by the sending unit 302 may include a third precoding matrix indicator $PMI_3$ and a fourth precoding matrix indicator $PMI_4$, $PMI_3$ is used to indicate $i_1$, $PMI_4$ is used to indicate $i_2$ and $i_3$, and specifically, $PMI_4$ may be a joint coding value of $i_2$ and $i_3$. The transmit end may determine $i_2$ and $i_3$ by using a value of $PMI_4$ and a correspondence between $i_2$ and $i_3$. For example, the transmit end may preset a correspondence between $PMI_4$ and $i_2$, determine $i_2$ by using the value of $PMI_4$, and then determine $i_3$ according to a relation $PMI_4 = P \cdot i_2 + i_3$; similarly, the transmit end may preset a correspondence between $PMI_4$ and $i_3$, determine $i_3$ by using the value of $PMI_4$, and then determine $i_2$ according to a relation $PMI_4 = P \cdot i_2 + i_3$.

It should be understood that a manner of indicating a precoding matrix by the receive end is not limited in this embodiment of the present disclosure.

Therefore, in this embodiment of the present disclosure, $\theta_1$ and $\theta_2$ may be selected independently according to a current channel characteristic by using $i_2$ and $i_3$ respectively, thereby ensuring a weak correlation between codebooks corresponding to antennas with a large spacing.

Optionally, in another implementation manner, values of $\theta_1$ and $\theta_2$ may also be $$\theta_1 = \frac{2\pi}{N}\left(A \cdot i_1 + \left\lfloor \frac{i_4}{P \cdot M} \right\rfloor\right) \text{ and } \theta_2 = \frac{2\pi}{N}\left(A \cdot i_1 + \left\lfloor \frac{(i_4 \bmod (M \cdot P))}{M} \right\rfloor\right)$$

respectively, where $N=2^k$, k is a non-negative integer, A is a positive integer that can be divided exactly by N, P is a positive integer less than N, $i_1$ is a non-negative integer less than (N/A−1), $i_4$ is a positive integer less than (PM−1) (for example, P=4, M=4, and $i_4$<15), $\lfloor \cdot \rfloor$ is a round-down operation symbol, and mod is a modulo operation symbol. That is, N is 2 raised to the power, and may be a value of 0, 2, 4, 8, . . . , and the like, $P \in \{0, 1, \ldots, N-1\}$, and $i_1 \in \{0, 1, \ldots, N/A-1\}$.

Optionally, the precoding matrix indicator PMI sent by the sending unit 302 may include a fifth precoding matrix indicator $PMI_5$ and a sixth precoding matrix indicator $PMI_6$, the $PMI_5$ is used to indicate $i_1$, and $PMI_6$ is used to indicate $i_4$.

Optionally, in another implementation manner, values of $\theta_1$ and $\theta_2$ may also be $$\theta_1 = 2\pi\frac{m}{N}$$

and $\theta_2 = \theta_1 + \Delta\theta$ respectively, where $N=2^k$, k is a non-negative integer, m is a non-negative integer less than N, $\Delta\theta = 2\pi t$, and an absolute value of t is less than 1, for example, t is ⅛, −1/16, −1/32, 0, 1/32, 1/16 or ⅛.

Therefore, in this embodiment of the present disclosure, by using a phase offset $\theta_1$ between $\theta_2$ and $\Delta\theta$, $\Delta\theta$ may be controlled within a limited change range according to a current channel characteristic, thereby ensuring a weak correlation between codebooks corresponding to antennas with a large spacing.

Optionally, as another embodiment, the selection unit 301 may be further configured to perform row displacement or column displacement on the precoding matrix W according to a serial number of an antenna.

It should be pointed out that, manners of denoting the foregoing codebook (or precoding matrix) by using other equivalent matrices all fall within the scope of the present disclosure. For example, the precoding matrix obtained after the precoding matrix W in this embodiment of the present disclosure is subject to row or column displacement also falls within the scope of the present disclosure, for example, different antenna serial numbers correspondingly cause row displacement of the precoding matrix.

Optionally, as another embodiment, the receive end 300 may further include a receiving unit 304, and the receiving unit 304 is configured to receive the reference signal sent by the transmit end. The determining unit 303 is specifically configured to determine a rank indicator based on the reference signal received by the receiving unit 304; or, the selection unit 301 is specifically configured to select the precoding matrix W from the codebook based on the reference signal received by the receiving unit 304. The reference signal includes at least one of the following: a CSI RS, a DM RS and a CRS.

Figure 4:
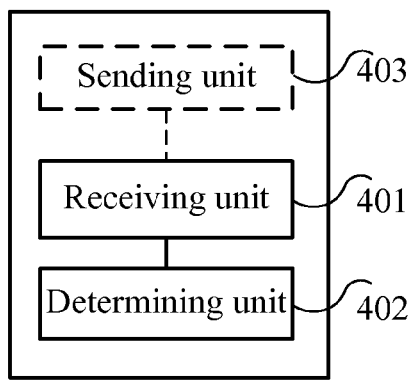
FIG. 4 is a structural block diagram of a transmit end according to an embodiment of the present disclosure.

FIG. 4 is a structural block diagram of a transmit end according to an embodiment of the present disclosure. The transmit end 400 in FIG. 4 includes a receiving unit 401 and a determining unit 402.

The receiving unit 401 is configured to receive a precoding matrix indicator PMI sent by a receive end.

The determining unit 402 is configured to determine, according to the precoding matrix indicator PMI received by the receiving unit 401, a precoding matrix W that is selected by the receive end from a codebook based on a reference signal, where $$W \in \begin{bmatrix} X_1(\theta_1) \\ X_2(\theta_2, \varphi_n) \end{bmatrix},$$

a matrix $X_1$ is determined according to $\theta_1$, a matrix $X_2$ is determined according to $\theta_2$ and $\phi_n$, $\theta_1$ indicates a phase difference of weighted values for signal transmission between two neighboring antennas in a first antenna group of the transmit end, where the signal transmission between the two neighboring antennas in the first antenna group is for a same transmission layer, $\theta_2$ indicates a phase difference of weighted values for signal transmission between two neighboring antennas in a second antenna group of the transmit end, where the signal transmission between the two neighboring antennas in the second antenna group is for the same transmission layer, $\phi_n$ indicates a phase difference of weighted values for signal transmission between the first antenna group and the second antenna group, where the signal transmission between the first antenna group and the second antenna group is for a same transmission layer, $$\varphi_n = e^{\frac{j2\pi n}{M}},$$

M is a positive integer, n is a non-negative integer less than M, $\theta_1$ and $\theta_2$ of at least one precoding matrix in the codebook are different, and the first antenna group and the second antenna group belong to a same multi-antenna system.

Based on the foregoing solution, a transmit end receives a precoding matrix indicator PMI sent by a receive end, and determines, according to the precoding matrix indicator PMI, a precoding matrix W that is selected by the receive end from a codebook based on a reference signal, where $$W \in \begin{bmatrix} X_1(\theta_1) \\ X_2(\theta_2, \varphi_n) \end{bmatrix},$$

and $\theta_1$ and $\theta_2$ respectively indicate the phase difference of the weighted values for the signal transmission between the two neighboring antennas in the first antenna group and the phase difference of the weighted values for the signal transmission between the two neighboring antennas in the second antenna group, where the signal transmission between the two neighboring antennas in the first antenna group and the signal transmission between the two neighboring antennas in the second antenna group are for the same transmission layer. In this way, an appropriate precoding matrix may be selected according to an antenna spacing condition, to ensure a weak correlation between antennas, and therefore, the transmit end performs precoding based on the precoding matrix fed back by the receive end and selected from a codebook structure of the present disclosure, to effectively improve the precoding precision, thereby reducing the performance loss, and improving the system throughput.

The transmit end 400 may implement each step of the transmit end involved in the method in FIG. 1 to FIG. 2, which is not described in detail again to avoid repetition.

Optionally, as an embodiment, the precoding matrix W and the rank indicator are corresponding to each other, and the rank indicator is corresponding to a quantity of useful transmission layers.

Specifically, a codebook with a rank indicator of 1 may be the foregoing formula (1); or, a codebook with a rank indicator of 2 may be the foregoing formula (2).

The codebook in the present disclosure may further be a codebook whose rank indicator is another value. For ease of description, in the present disclosure, description is made by using a codebook with a rank indicator of 1 and a codebook with a rank indicator of 2 as an example, and it should be understood that this is not limited in the present disclosure.

It should be further understood that the foregoing codebook is indicated in a form of a single-codebook structure, and certainly, may also be indicated in a form of a double-codebook structure, and this is not limited in the present disclosure.

Optionally, in an implementation manner, that the rank indicator is 1 or 2 is used as an example, and when the rank indicator is 1, the precoding matrix determined by the determining unit 402 may be the foregoing formula (3); or, when the rank indicator is 2, the precoding matrix determined by the determining unit 402 may be the foregoing formula (4). For a specific example, reference may be made to the foregoing description, and details are not described herein again.

Optionally, the precoding matrix indicator PMI that the receiving unit 401 may be specifically configured to receive may include a first precoding matrix indicator $PMI_1$ and a second precoding matrix indicator $PMI_2$. Optionally, $PMI_1$ and $PMI_2$ may have a same time-domain or frequency-domain granularity or different time-domain or frequency-domain granularities (or be based on different subframe periods or subband sizes). The receiving unit 401 may be specifically configured to receive, at a long time interval, $PMI_1$ sent by the receive end, and receive, at a short time interval, $PMI_2$ sent by the receive end. The determining unit 402 may be specifically configured to determine, according to $PMI_1$, $W_1$ selected by the receive end from the codebook based on the reference signal, and determine, according to $PMI_2$, $W_2^1$ or $W_2^2$ selected by the receive end from the codebook. Correspondingly, the determining unit 402 may be further specifically configured to determine the precoding matrix W according to $W_1$ and $W_2^1$, or determine the precoding matrix W according to $W_1$ and $W_2^2$.

Optionally, $W_1$ is a matrix indicating a broadband channel characteristic, both $W_2^1$ and $W_2^2$ are matrices indicating a subband channel characteristic, and a digital of a superscript in $W_2$ indicates a value of a rank; or $W_1$ is a matrix indicating a long-term channel characteristic, and both $W_2^1$ and $W_2^2$ are matrices indicating a short-term channel characteristic.

Certainly, the determining unit 402 may be specifically configured to directly determine a selected precoding matrix W by using a PMI sent by the receive end and received by the receiving unit 401. For example, a codebook totally has 256 precoding matrices, and when the PMI sent by the receive end and received by the receiving unit 401 is 0, the determining unit 402 determines that what is selected by the receive end is a first precoding matrix of the 256 precoding matrices of the codebook, and when the PMI sent by the receive end and received by the receiving unit 401 is 1, the determining unit 402 determines that what is selected by the receive end is a second precoding matrix of the 256 precoding matrices of the codebook, . . . , that is, values 0 to 255 of the PMI are respectively corresponding to corresponding precoding matrices of the 256 precoding matrices. It should be understood that a manner in which the UE indicates a precoding matrix is not limited in this embodiment of the present disclosure.

It should be understood that a manner of indicating a precoding matrix by the receive end is not limited in this embodiment of the present disclosure.

Optionally, the receiving unit 401 of the transmit end 400 may receive, by using a physical control channel or physical shared channel, the precoding matrix indicator PMI sent by the receive end. It should be understood that this is not limited in this embodiment of the present disclosure.

Therefore, a column vector is selected independently from the matrix X separately by using the column selection vectors Y1 and Y2 in this embodiment of the present disclosure, thereby ensuring a weak correlation between codebooks corresponding to antennas with a large spacing.

Optionally, in another implementation manner, when the rank indicator is 1, the precoding matrix determined by the determining unit 402 may be the foregoing formula (12) or (13). For a specific example, reference may be made to the foregoing description, and details are not described herein again.

Optionally, the precoding matrix indicator PMI that the receiving unit 401 may be specifically configured to receive may include a seventh precoding matrix indicator $PMI_7$ and an eighth precoding matrix indicator $PMI_8$. Optionally, $PMI_7$ and $PMI_8$ may have a same time-domain or frequency-domain granularity or different time-domain or frequency-domain granularities (or be based on different subframe periods or subband sizes). The receiving unit 401 may be specifically configured to receive, at a long time interval, $PMI_7$ sent by the receive end, and receive, at a short time interval, $PMI_8$ sent by the receive end. The determining unit 402 may be specifically configured to determine, according to $PMI_7$, $W_1$ selected by the receive end from the codebook based on the reference signal, and determine, according to $PMI_8$, $W_4^1$ selected by the receive end from the codebook. Correspondingly, the determining unit 402 may be further specifically configured to determine the precoding matrix W according to $W_1$ and $W_4^1$.

Optionally, $W_3$ is a matrix indicating a broadband channel characteristic, and $W_4^1$ is a matrix indicating a subband channel characteristic, or $W_3$ is a matrix indicating a long-term channel characteristic, and $W_4^1$ is a matrix indicating a short-term channel characteristic.

Optionally, in another implementation manner, when the rank indicator is 2, the precoding matrix determined by the determining unit 402 may be the foregoing formula (14) or (16). For a specific example, reference may be made to the foregoing description, and details are not described herein again.

Optionally, the precoding matrix indicator PMI that the receiving unit 401 may be specifically configured to receive may include a ninth precoding matrix indicator $PMI_9$ and a tenth precoding matrix indicator $PMI_{10}$. The receiving unit 401 may be specifically configured to receive, at a long time interval, $PMI_9$ sent by the receive end, and receive, at a short time interval, $PMI_{10}$ sent by the receive end. The determining unit 402 may be specifically configured to determine, according to $PMI_9$, $W_1$ selected by the receive end from the codebook based on the reference signal, and determine, according to $PMI_{10}$, $W_4^2$ selected by the receive end from the codebook. Correspondingly, the determining unit 402 may be further specifically configured to determine the precoding matrix W according to $W_1$ and $W_4^2$.

Optionally, $W_3$ is a matrix indicating a broadband channel characteristic, and $W_4^2$ is a matrix indicating a subband channel characteristic, or $W_3$ is a matrix indicating a long-term channel characteristic, and $W_4^2$ is a matrix indicating a short-term channel characteristic.

Therefore, θ' is selected in this embodiment of the present disclosure, thereby ensuring a weak correlation between codebooks corresponding to antennas with a large spacing.

Optionally, in another implementation manner, values of $\theta_1$ and $\theta_2$ may be $$\theta_1 = \frac{2\pi}{N}(A \cdot i_1 + \lfloor i_2/M \rfloor) \text{ and } \theta_2 = \frac{2\pi}{N}(A \cdot i_1 + i_3)$$

respectively, where $N=2^k$, the k is a non-negative integer, A is a positive integer that can be divided exactly by N (for example, N=16, and A=2), M is a positive integer less than N, $i_1$ is a non-negative integer less than (N/A−1), both $i_2$ and $i_3$ are positive integers, $i_2$ and $i_3$ are independent from each other, and $\lfloor \cdot \rfloor$ is a round-down operation symbol. That is, N is 2 raised to the power, and may be a value of 0, 2, 4, 8, . . . , and the like, $P \in \{0, 1, \ldots, N-1\}$, and $i_1 \in \{0, 1, \ldots, N/A-1\}$.

Optionally, the receiving unit 401 may be specifically configured to receive a third precoding matrix indicator $PMI_3$ and a fourth precoding matrix indicator $PMI_4$ sent by the receive end. Further, $PMI_3$ and $PMI_4$ sent by the receive end are received in a same period of time or different periods of time. The determining unit 402 may be specifically configured to determine $i_1$ according to $PMI_3$, and determine $i_2$ and $i_3$ according to $PMI_4$. Specifically, $PMI_4$ may be a joint coding value of $i_2$ and $i_3$, and $PMI_4 = P \cdot i_2 + i_3$. The determining unit 402 may be specifically configured to determine $i_2$ and $i_3$ by using a value of $PMI_4$ and a correspondence between $i_2$ and $i_3$.

In other words, $PMI_3$ and $PMI_4$ may have different time-domain or frequency-domain granularities. Certainly, the determining unit 402 may be specifically configured to directly determine the selected precoding matrix W by using a PMI sent by the receive end and received by the receiving unit 401. For a specific implementation manner, reference may be made to the foregoing embodiment, and details are not described herein again.

It should be understood that a manner of indicating a precoding matrix by the receive end is not limited in this embodiment of the present disclosure.

Optionally, the receiving unit 401 of the transmit end 400 may receive, by using a physical control channel or physical shared channel, the precoding matrix indicator PMI sent by the receive end. It should be understood that this is not limited in this embodiment of the present disclosure.

Therefore, in this embodiment of the present disclosure, $\theta_1$ and $\theta_2$ may be selected independently according to a current channel characteristic by using $i_2$ and $i_3$ respectively, thereby ensuring a weak correlation between codebooks corresponding to antennas with a large spacing.

Optionally, in another implementation manner, values of $\theta_1$ and $\theta_2$ may also be $$\theta_1 = \frac{2\pi}{N}\left(A \cdot i_1 + \left\lfloor \frac{i_4}{P \cdot M} \right\rfloor\right) \text{ and } \theta_2 = \frac{2\pi}{N}\left(A \cdot i_1 + \left\lfloor \frac{(i_4 \bmod(M \cdot P))}{M} \right\rfloor\right)$$

respectively, where $N=2^k$, k is a non-negative integer, A is a positive integer that can be divided exactly by N, P is a positive integer less than N, $i_1$ is a non-negative integer less than (N/A−1), $i_4$ is a positive integer less than (PM−1) (for example, P=4, M=4, and $i_4$<15), $\lfloor \cdot \rfloor$ is a round-down operation symbol, and mod is a modulo operation symbol. That is, N is 2 raised to the power, and may be a value of 0, 2, 4, 8, . . . , and the like, $P \in \{0, 1, \ldots, N-1\}$, and $i_1 \in \{0, 1, \ldots, N/A-1\}$.

Optionally, the receiving unit 401 may be specifically configured to receive a fifth precoding matrix indicator $PMI_5$ and a sixth precoding matrix indicator $PMI_6$ sent by the receive end. Further, $PMI_5$ and $PMI_6$ sent by the receive end are received in a same period of time or different periods of time. The determining unit 402 may be specifically configured to determine $i_1$ according to $PMI_5$, and determine $i_4$ according to $PMI_6$. In other words, $PMI_5$ and $PMI_6$ may have different time-domain or frequency-domain granularities. Certainly, the determining unit 402 may be specifically configured to directly determine the selected precoding matrix W by using a PMI sent by the receive end and received by the receiving unit 401. For a specific implementation manner, reference may be made to the foregoing embodiment, and details are not described herein again.

It should be understood that a manner of indicating a precoding matrix by the receive end is not limited in this embodiment of the present disclosure.

Optionally, the receiving unit 401 of the transmit end 400 may receive, by using a physical control channel or physical shared channel, the precoding matrix indicator PMI sent by the receive end. It should be understood that this is not limited in this embodiment of the present disclosure.

It should be understood that a manner of indicating a precoding matrix by the receive end is not limited in this embodiment of the present disclosure.

Therefore, in this embodiment of the present disclosure, $\theta_1$ and $\theta_2$ may be determined according to a current channel characteristic by using $i_4$, and $\theta_1$ and $\theta_2$ in the selected precoding matrix may be the same or different, thereby ensuring a weak correlation between codebooks corresponding to antennas with a large spacing.

Optionally, in another implementation manner, values of $\theta_1$ and $\theta_2$ may also be $$\theta_1 = 2\pi \frac{m}{N}$$

and $\theta_2 = \theta_1 + \Delta\theta$ respectively, where $N=2^k$, k is a non-negative integer, m is a non-negative integer less than N, $\Delta\theta = 2\pi t$, and an absolute value of t is less than 1, for example, t is ⅛, −1/16, −1/32, 0, 1/32, 1/16 or ⅛.

Similarly, the receiving unit 401 may be specifically configured to receive two precoding matrix indicators sent by the receive end, and the two precoding matrix indicators indicate $\theta_1$ and $\Delta\theta$ respectively. Further, the two precoding matrix indicators sent by the receive end may also be received in a same period of time or different periods of time, and in other words, the two precoding matrix indicators may have different time-domain or frequency-domain granularities. The determining unit 402 may be specifically configured to determine the precoding matrix W by using $\theta_1$ and $\Delta\theta$. Certainly, the determining unit 402 may be specifically configured to directly determine the selected precoding matrix W by using a PMI sent by the receive end and received by the receiving unit 401. For a specific implementation manner, reference may be made to the foregoing embodiment, and details are not described herein again.

It should be understood that a manner of indicating a precoding matrix by the receive end is not limited in this embodiment of the present disclosure.

Optionally, the receiving unit 401 of the transmit end 400 may receive, by using a physical control channel or physical shared channel, the precoding matrix indicator PMI sent by the receive end. It should be understood that this is not limited in this embodiment of the present disclosure.

Therefore, in this embodiment of the present disclosure, by using a phase offset $\theta_1$ between $\theta_2$ and $\Delta\theta$, $\Delta\theta$ may be controlled within a limited change range according to a current channel characteristic, thereby ensuring a weak correlation between codebooks corresponding to antennas with a large spacing.

Optionally, as another embodiment, the determining unit 402 may be further configured to perform row displacement or column displacement on the precoding matrix W according to a serial number of an antenna.

It should be pointed out that, manners of denoting the foregoing codebook (or precoding matrix) by using other equivalent matrices all fall within the scope of the present disclosure. For example, the precoding matrix obtained after the precoding matrix W in this embodiment of the present disclosure is subject to row or column displacement also falls within the scope of the present disclosure, for example, different antenna serial numbers correspondingly cause row displacement of the precoding matrix.

Optionally, as another embodiment, the transmit end 400 may further include a sending unit 403, and the sending unit 403 is configured to send the reference signal to the receive end, so that the receive end selects the precoding matrix W from the codebook based on the reference signal. The reference signal includes at least one of the following: a CSI RS, a DM RS and a CRS.

Figure 5:
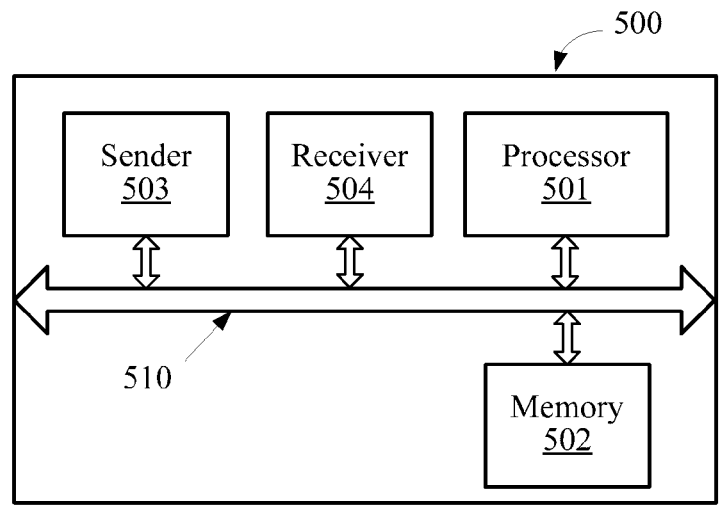
FIG. 5 is a block diagram of a device according to an embodiment of the present disclosure.

This embodiment of the present disclosure further provides an apparatus embodiment implementing steps and methods in the foregoing method embodiment. FIG. 5 shows an embodiment of a device, and in the embodiment, the device 500 includes a processor 501, a memory 502, a sender 503 and a receiver 504. The processor 501 controls an operation of the device 500, and the processor 501 may be further referred to as a central processing unit (CPU). The memory 502 may include a read-only memory and a random access memory, and provide an instruction and data to the processor 501. A part of the memory 502 may further include a non-volatile random access memory (NVRAM). The processor 501, the memory 502, the sender 503 and the receiver 504 are coupled together by using a bus system 510, where besides including a data bus, the bus system 510 further includes a power supply bus, a control bus and a state signal bus. However, for the sake of clear description, various buses are all marked as the bus system 510 in FIG. 5.

The foregoing method disclosed in the embodiment of the present disclosure is applicable to the foregoing device 500. The processor 501 may be an integrated circuit chip, and have a signal processing capability. During implementation, steps of the foregoing method may be implemented by using a hardware integrated logic circuit in the processor 501 or an instruction in a form of software.

Figure 6:
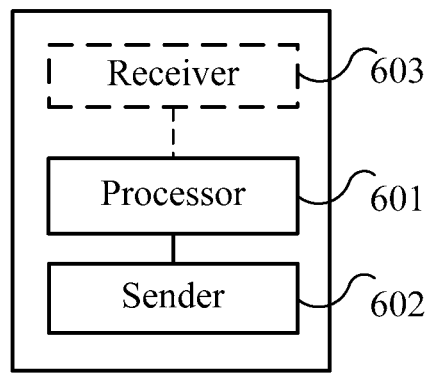
FIG. 6 is a structural block diagram of a receive end according to another embodiment of the present disclosure.

Further, FIG. 6 is a structural block diagram of a receive end according to another embodiment of the present disclosure. The receive end 600 includes a processor 601 and a sender 602.

The processor 601 is configured to select a precoding matrix W from a codebook based on a reference signal, where the $$W \in \begin{bmatrix} X_1(\theta_1) \\ X_2(\theta_2, \varphi_n) \end{bmatrix},$$

a matrix $X_1$ is determined according to $\theta_1$, a matrix $X_2$ is determined according to $\theta_2$ and $\phi_n$, $\theta_1$ indicates a phase difference of weighted values for signal transmission between two neighboring antennas in a first antenna group of a transmit end, where the signal transmission between the two neighboring antennas in the first antenna group is for a same transmission layer, $\theta_2$ indicates a phase difference of weighted values for signal transmission between two neighboring antennas in a second antenna group of the transmit end, where the signal transmission between the two neighboring antennas in the second antenna group is for the same transmission layer, $\phi_n$ indicates a phase difference of weighted values for signal transmission between the first antenna group and the second antenna group, where the signal transmission between the first antenna group and the second antenna group is for a same transmission layer, $$\varphi_n = e^{\frac{j2\pi n}{M}},$$

M is a positive integer, n is a non-negative integer less than the M, $\theta_1$ and $\theta_2$ of at least one precoding matrix in the codebook are different, and the first antenna group and the second antenna group belong to a same multi-antenna system.

The sender 602 is configured to send a precoding matrix indicator PMI to the transmit end, so that the transmit end determines, according to the PMI, the precoding matrix W selected by the processor 601.

The multi-antenna system refers to a system in which the transmit end and the receive end perform communication by using multiple antennas. Compared with a single-antenna system, multiple antennas of the transmit end and the receive end can form a spatial diversity gain or multiplexing gain, which can effectively improve the transmission reliability and the system capacity. The diversity gain and the multiplexing gain of the multi-antenna system may generally be obtained by using a precoding method of the transmit end and a receive signal combination algorithm of the receive end. For example, in an LTE system, a transmit end uses four antennas, and a receive end uses two antennas.

Additionally, the multi-antenna system of this embodiment of the present disclosure is also applicable to a scenario of multi-point joint transmission, and the multi-point joint transmission refers to that multiple transmit ends perform joint signal transmission for a same user, for example, a transmit end A has two antennas, a transmit end B also has two antennas, and the two transmit ends perform joint transmission for a receive end at the same time. Then, a signal received by the receive end may be considered as a signal sent by a 4-antenna base station.

Based on the foregoing solution, the receive end selects the precoding matrix W from the codebook based on the reference signal, where $$W \in \begin{bmatrix} X_1(\theta_1) \\ X_2(\theta_2, \varphi_n) \end{bmatrix},$$

and $\theta_1$ and $\theta_2$ respectively indicate the phase difference of the weighted values for the signal transmission between the two neighboring antennas in the first antenna group and the phase difference of the weighted values for the signal transmission between the two neighboring antennas in the second antenna group, where the signal transmission between the two neighboring antennas in the first antenna group and the signal transmission between the two neighboring antennas in the second antenna group are for the same transmission layer. In this way, an appropriate precoding matrix may be selected according to an antenna spacing condition, to ensure a weak correlation between antennas, and therefore, the transmit end performs precoding based on the precoding matrix fed back by the receive end and selected from a codebook structure of the present disclosure, to effectively improve the precoding precision, thereby reducing the performance loss, and improving the system throughput.

In this embodiment of the present disclosure, the transmit end may be a base station, and correspondingly, the receive end may be UE; or the transmit end may be UE, and correspondingly, the receive end may be a base station. It should be understood that this is not limited in this embodiment of the present disclosure.

The receive end 600 may implement each step of the receive end involved in the method in FIG. 1 to FIG. 2, which is not described in detail again to avoid repetition.

Optionally, as an embodiment, the processor 601 may be further configured to determine a rank indicator based on the reference signal, where the rank indicator is corresponding to a quantity of useful transmission layers. The processor 601 is specifically configured to select the precoding matrix W corresponding to the rank indicator from the codebook based on the reference signal.

Specifically, when the rank indicator determined by the processor 601 is 1, the precoding matrix selected by the processor 601 may be the foregoing formula (1); or, when the rank indicator determined by the processor 601 is 2, the precoding matrix selected by the processor 601 may be the foregoing formula (2).

The foregoing example is merely exemplary, and is not intended to limit the scope of the present disclosure, and the codebook in the present disclosure may further be a codebook whose rank indicator is another value. For ease of description, in the present disclosure, description is made by using a codebook with a rank indicator of 1 and a codebook with a rank indicator of 2 as an example, and it should be understood that this is not limited in the present disclosure.

It should be further understood that the foregoing codebook is indicated in a form of a single-codebook structure, and certainly, may also be indicated in a form of a double-codebook structure, and this is not limited in the present disclosure.

Optionally, in an implementation manner, that the rank indicator is 1 or 2 is used as an example, and when the rank indicator determined by the processor 601 is 1, the precoding matrix selected by the processor 601 may be the foregoing formula (3); or, when the rank indicator determined by the processor 601 is 2, the precoding matrix selected by the processor 601 may be the foregoing formula (4). For a specific example, reference may be made to the foregoing description, and details are not described herein again.

Optionally, $W_1$ is a matrix indicating a broadband channel characteristic, both $W_2^1$ and $W_2^2$ are matrices indicating a subband channel characteristic, and a digital of a superscript in $W_2$ indicates a value of a rank; or $W_1$ is a matrix indicating a long-term channel characteristic, and both $W_2^1$ and $W_2^2$ are matrices indicating a short-term channel characteristic. Correspondingly, the transmit end may receive, at a long time interval, $PMI_1$ sent by the receive end, and receive, at a short time interval, $PMI_2$ sent by the receive end.

Optionally, the precoding matrix indicator PMI sent by the sender 602 may include a first precoding matrix indicator $PMI_1$ and a second precoding matrix indicator $PMI_2$, $PMI_1$ is used to indicate $W_1$, and $PMI_2$ is used to indicate $W_2^1$ or $W_2^2$.

Therefore, a column vector is selected independently from the matrix X separately by using the column selection vectors Y1 and Y2 in this embodiment of the present disclosure, thereby ensuring a weak correlation between codebooks corresponding to antennas with a large spacing.

Optionally, in another implementation manner, when the rank indicator determined by the processor 601 is 1, the precoding matrix selected by the processor 601 may be the foregoing formula (12) or (13), and for a specific example, reference may be made to the foregoing description, and details are not described herein again.

Optionally, $W_3$ is a matrix indicating a broadband channel characteristic, and $W_4^1$ is a matrix indicating a subband channel characteristic, or $W_3$ is a matrix indicating a long-term channel characteristic, and $W_4^1$ is a matrix indicating a short-term channel characteristic.

Optionally, the precoding matrix indicator PMI sent by the sender 602 may include a seventh precoding matrix indicator $PMI_7$ and an eighth precoding matrix indicator $PMI_8$, $PMI_7$ is used to indicate $W_3$, and $PMI_8$ is used to indicate $W_4^1$. In other words, $PMI_7$ and $PMI_8$ may have a same time-domain or frequency-domain granularity or different time-domain or frequency-domain granularities (or be based on different subframe periods or subband sizes). Correspondingly, the transmit end may receive, at a long time interval, $PMI_7$ sent by the sender 602, and receive, at a short time interval, $PMI_8$ sent by the sender 602.

Optionally, in another implementation manner, when the rank indicator determined by the processor 601 is 2, the precoding matrix selected by the processor 601 may be the foregoing formula (14) or (16), and for a specific example, reference may be made to the foregoing description, and details are not described herein again.

Optionally, $W_3$ is a matrix indicating a broadband channel characteristic, and $W_4^2$ is a matrix indicating a subband channel characteristic, or $W_3$ is a matrix indicating a long-term channel characteristic, and $W_4^2$ is a matrix indicating a short-term channel characteristic.

Optionally, the precoding matrix indicator PMI sent by the sender 602 may include a ninth precoding matrix indicator $PMI_9$ and a tenth precoding matrix indicator $PMI_{10}$, $PMI_9$ is used to indicate $W_3$, and $PMI_{10}$ is used to indicate $W_4^2$. Correspondingly, the transmit end may receive, at a long time interval, $PMI_9$ sent by the sender 602, and receive, at a short time interval, $PMI_{10}$ sent by the sender 602.

Therefore, θ' is selected in this embodiment of the present disclosure, thereby ensuring a weak correlation between codebooks corresponding to antennas with a large spacing.

Optionally, in another implementation manner, values of $\theta_1$ and $\theta_2$ may be $$\theta_1 = \frac{2\pi}{N}(A \cdot i_1 + \lfloor i_2/M \rfloor) \text{ and } \theta_2 = \frac{2\pi}{N}(A \cdot i_1 + i_3)$$

respectively, where $N=2^k$, the k is a non-negative integer, A is a positive integer that can be divided exactly by N (for example, N=16, and A=2), M is a positive integer less than N, $i_1$ is a non-negative integer less than (N/A−1), both $i_2$ and $i_3$ are positive integers, $i_2$ and $i_3$ are independent from each other, and $\lfloor \cdot \rfloor$ is a round-down operation symbol. That is, N is 2 raised to the power, and may be a value of 0, 2, 4, 8, . . . , and the like, P∈{0, 1, . . . , N−1}, and $i_1$∈{0, 1, . . . , N/A−1}.

Optionally, the precoding matrix indicator PMI sent by the sender 602 may include a third precoding matrix indicator $PMI_3$ and a fourth precoding matrix indicator $PMI_4$, $PMI_3$ is used to indicate $i_1$, $PMI_4$ is used to indicate $i_2$ and $i_3$, and specifically, $PMI_4$ may be a joint coding value of $i_2$ and $i_3$. The transmit end may determine $i_2$ and $i_3$ by using a value of $PMI_4$ and a correspondence between $i_2$ and $i_3$. For example, the transmit end may preset a correspondence between $PMI_4$ and $i_2$, determine $i_2$ by using the value of $PMI_4$, and then determine $i_3$ according to a relation $PMI_4=P \cdot i_2+i_3$; similarly, the transmit end may preset a correspondence between $PMI_4$ and $i_3$, determine $i_3$ by using the value of $PMI_4$, and then determine $i_2$ according to a relation $PMI_4=P \cdot i_2+i_3$.

It should be understood that a manner of indicating a precoding matrix by the receive end is not limited in this embodiment of the present disclosure.

Therefore, in this embodiment of the present disclosure, $\theta_1$ and $\theta_2$ may be selected independently according to a current channel characteristic by using $i_2$ and $i_3$ respectively, thereby ensuring a weak correlation between codebooks corresponding to antennas with a large spacing.

Optionally, in another implementation manner, values of $\theta_1$ and $\theta_2$ may also be $$\theta_1 = \frac{2\pi}{N}\left(A \cdot i_1 + \left\lfloor \frac{i_4}{P \cdot M} \right\rfloor\right) \text{ and } \theta_2 = \frac{2\pi}{N}\left(A \cdot i_1 + \left\lfloor \frac{(i_4 \bmod(M \cdot P))}{M} \right\rfloor\right)$$

respectively, where $N=2^k$, k is a non-negative integer, A is a positive integer that can be divided exactly by N, P is a positive integer less than N, $i_1$ is a non-negative integer less than (N/A−1), $i_4$ is a positive integer less than (PM−1) (for example, P=4, M=4, and $i_4$<15), $\lfloor \cdot \rfloor$ is a round-down operation symbol, and mod is a modulo operation symbol. That is, N is 2 raised to the power, and may be a value of 0, 2, 4, 8, . . . , and the like, P∈{0, 1, . . . , N−1}, and $i_1$∈{0, 1, . . . , N/A−1}.

Optionally, the precoding matrix indicator PMI sent by the sender 602 may include a fifth precoding matrix indicator $PMI_5$ and a sixth precoding matrix indicator $PMI_6$, the $PMI_5$ is used to indicate $i_1$, and $PMI_6$ is used to indicate $i_4$.

Optionally, in another implementation manner, values of $\theta_1$ and $\theta_2$ may also be $$\theta_1 = 2\pi\frac{m}{N}$$

and $\theta_2=\theta_1+\Delta\theta$ respectively, where $N=2^k$, k is a non-negative integer, m is a non-negative integer less than N, $\Delta\theta=2\pi t$, and an absolute value of t is less than 1, for example, t is ⅛, −1/16, −1/32, 0, 1/32, 1/16 or ⅛.

Therefore, in this embodiment of the present disclosure, by using a phase offset $\theta_1$ between $\theta_2$ and $\Delta\theta$, $\Delta\theta$ may be controlled within a limited change range according to a current channel characteristic, thereby ensuring a weak correlation between codebooks corresponding to antennas with a large spacing.

Optionally, as another embodiment, the processor 601 may be further configured to perform row displacement or column displacement on the precoding matrix W according to a serial number of an antenna.

It should be pointed out that, manners of denoting the foregoing codebook (or precoding matrix) by using other equivalent matrices all fall within the scope of the present disclosure. For example, the precoding matrix obtained after the precoding matrix W in this embodiment of the present disclosure is subject to row or column displacement also falls within the scope of the present disclosure, for example, different antenna serial numbers correspondingly cause row displacement of the precoding matrix.

Optionally, as another embodiment, the receive end 600 may further include a receiver 603, and the receiver 603 is configured to receive the reference signal sent by the transmit end. The processor 602 is specifically configured to determine a rank indicator based on the reference signal received by the receiver 603; or, the processor 602 is specifically configured to select the precoding matrix W from the codebook based on the reference signal received by the receiver 304. The reference signal includes at least one of the following: a CSI RS, a DM RS and a CRS.

Figure 7:
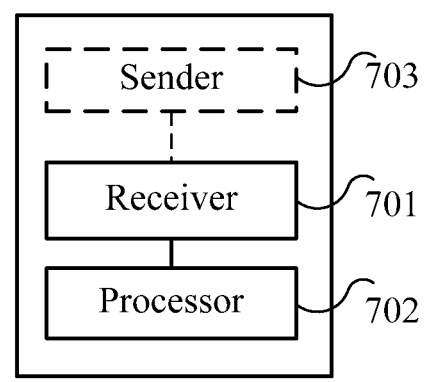
FIG. 7 is a structural block diagram of a transmit end according to another embodiment of the present disclosure.

FIG. 7 is a structural block diagram of a transmit end according to another embodiment of the present disclosure. The transmit end 700 in FIG. 7 includes a receiver 701 and a processor 702.

The receiver 701 is configured to receive a precoding matrix indicator PMI sent by a receive end.

The processor 702 is configured to determine, according to the precoding matrix indicator PMI received by the receiver 701, a precoding matrix W that is selected by the receive end from a codebook based on a reference signal, where $$W \in \begin{bmatrix} X_1(\theta_1) \\ X_2(\theta_2, \varphi_n) \end{bmatrix},$$

a matrix $X_1$ is determined according to $\theta_1$, a matrix $X_2$ is determined according to $\theta_2$ and $\phi_n$, $\theta_1$ indicates a phase difference of weighted values for signal transmission between two neighboring antennas in a first antenna group of the transmit end, where the signal transmission between the two neighboring antennas in the first antenna group is for a same transmission layer, $\theta_2$ indicates a phase difference of weighted values for signal transmission between two neighboring antennas in a second antenna group of the transmit end, where the signal transmission between the two neighboring antennas in the second antenna group is for the same transmission layer, $\phi_n$ indicates a phase difference of weighted values for signal transmission between the first antenna group and the second antenna group, where the signal transmission between the first antenna group and the second antenna group is for a same transmission layer, $$\varphi_n = e^{\frac{j2\pi n}{M}},$$

M is a positive integer, n is a non-negative integer less than M, $\theta_1$ and $\theta_2$ of at least one precoding matrix in the codebook are different, and the first antenna group and the second antenna group belong to a same multi-antenna system.

Based on the foregoing solution, a transmit end receives a precoding matrix indicator PMI sent by a receive end, and determines, according to the precoding matrix indicator PMI, a precoding matrix W that is selected by the receive end from a codebook based on a reference signal, where $$W \in \begin{bmatrix} X_1(\theta_1) \\ X_2(\theta_2, \varphi_n) \end{bmatrix},$$

and $\theta_1$ and $\theta_2$ respectively indicate the phase difference of the weighted values for the signal transmission between the two neighboring antennas in the first antenna group and the phase difference of the weighted values for the signal transmission between the two neighboring antennas in the second antenna group, where the signal transmission between the two neighboring antennas in the first antenna group and the signal transmission between the two neighboring antennas in the second antenna group are for the same transmission layer. In this way, an appropriate precoding matrix may be selected according to an antenna spacing condition, to ensure a weak correlation between antennas, and therefore, the transmit end performs precoding based on the precoding matrix fed back by the receive end and selected from a codebook structure of the present disclosure, to effectively improve the precoding precision, thereby reducing the performance loss, and improving the system throughput.

The transmit end 700 may implement each step of the transmit end involved in the method in FIG. 1 to FIG. 2, which is not described in detail again to avoid repetition.

Optionally, as an embodiment, the precoding matrix W and the rank indicator are corresponding to each other, and the rank indicator is corresponding to a quantity of useful transmission layers.

Specifically, a codebook with a rank indicator of 1 may be the foregoing formula (1); or, a codebook with a rank indicator of 2 may be the foregoing formula (2).

The codebook in the present disclosure may further be a codebook whose rank indicator is another value. For ease of description, in the present disclosure, description is made by using a codebook with a rank indicator of 1 and a codebook with a rank indicator of 2 as an example, and it should be understood that this is not limited in the present disclosure.

It should be further understood that the foregoing codebook is indicated in a form of a single-codebook structure, and certainly, may also be indicated in a form of a double-codebook structure, and this is not limited in the present disclosure.

Optionally, in an implementation manner, that the rank indicator is 1 or 2 is used as an example, and when the rank indicator is 1, the precoding matrix determined by the processor 702 may be the foregoing formula (3); or, when the rank indicator is 2, the precoding matrix determined by the processor 702 may be the foregoing formula (4). For a specific example, reference may be made to the foregoing description, and details are not described herein again.

Optionally, the precoding matrix indicator PMI that the receiver 701 may be specifically configured to receive may include a first precoding matrix indicator $PMI_1$ and a second precoding matrix indicator $PMI_2$. Optionally, $PMI_1$ and $PMI_2$ may have a same time-domain or frequency-domain granularity or different time-domain or frequency-domain granularities (or be based on different subframe periods or subband sizes). The receiver 701 may be specifically configured to receive, at a long time interval, $PMI_1$ sent by the receive end, and receive, at a short time interval, $PMI_2$ sent by the receive end. The processor 702 may be specifically configured to determine, according to $PMI_1$, $W_1$ selected by the receive end from the codebook based on the reference signal, and determine, according to $PMI_2$, $W_2^1$ or $W_2^2$ selected by the receive end from the codebook. Correspondingly, the processor 702 may be further specifically configured to determine the precoding matrix W according to $W_1$ and $W_2^1$, or determine the precoding matrix W according to $W_1$ and $W_2^2$.

Optionally, $W_1$ is a matrix indicating a broadband channel characteristic, both $W_2^1$ and $W_2^2$ are matrices indicating a subband channel characteristic, and a digital of a superscript in $W_2$ indicates a value of a rank; or $W_1$ is a matrix indicating a long-term channel characteristic, and both $W_2^1$ and $W_2^2$ are matrices indicating a short-term channel characteristic.

Certainly, the processor 702 may be specifically configured to directly determine a selected precoding matrix W by using a PMI sent by the receive end and received by the receiver 701. For example, a codebook totally has 256 precoding matrices, and when the PMI sent by the receive end and received by the receiver 701 is 0, the processor 702 determines that what is selected by the receive end is a first precoding matrix of the 256 precoding matrices of the codebook, and when the PMI sent by the receive end and received by the receiver 701 is 1, the processor 702 determines that what is selected by the receive end is a second precoding matrix of the 256 precoding matrices of the codebook, . . . , that is, values 0 to 255 of the PMI are respectively corresponding to corresponding precoding matrices of the 256 precoding matrices. It should be understood that a manner of indicating a precoding matrix by the UE is not limited in this embodiment of the present disclosure.

It should be understood that a manner of indicating a precoding matrix by the receive end is not limited in this embodiment of the present disclosure.

Optionally, the receiver 701 of the transmit end 700 may receive, by using a physical control channel or physical shared channel, the precoding matrix indicator PMI sent by the receive end. It should be understood that this is not limited in this embodiment of the present disclosure.

Therefore, a column vector is selected independently from the matrix X separately by using the column selection vectors Y1 and Y2 in this embodiment of the present disclosure, thereby ensuring a weak correlation between codebooks corresponding to antennas with a large spacing.

Optionally, in another implementation manner, when the rank indicator is 1, the precoding matrix determined by the processor 702 may be the foregoing formula (12) or (13). For a specific example, reference may be made to the foregoing description, and details are not described herein again.

Optionally, the precoding matrix indicator PMI that the receiver 701 may be specifically configured to receive may include a seventh precoding matrix indicator $PMI_7$ and an eighth precoding matrix indicator $PMI_8$. Optionally, $PMI_7$ and $PMI_8$ may have a same time-domain or frequency-domain granularity or different time-domain or frequency-domain granularities (or be based on different subframe periods or subband sizes). The receiver 701 may be specifically configured to receive, at a long time interval, $PMI_7$ sent by the receive end, and receive, at a short time interval, $PMI_8$ sent by the receive end. The processor 702 may be specifically configured to determine, according to $PMI_7$, $W_1$ selected by the receive end from the codebook based on the reference signal, and determine, according to $PMI_8$, $W_4^1$ selected by the receive end from the codebook. Correspondingly, the processor 702 may be further specifically configured to determine the precoding matrix W according to $W_1$ and $W_4^1$.

Optionally, $W_3$ is a matrix indicating a broadband channel characteristic, and $W_4^1$ is a matrix indicating a subband channel characteristic, or $W_3$ is a matrix indicating a long-term channel characteristic, and $W_4^1$ is a matrix indicating a short-term channel characteristic.

Optionally, in another implementation manner, when the rank indicator is 2, the precoding matrix determined by the processor 702 may be the foregoing formula (14) or (16). For a specific example, reference may be made to the foregoing description, and details are not described herein again.

Optionally, the precoding matrix indicator PMI that the receiver 701 may be specifically configured to receive may include a ninth precoding matrix indicator $PMI_9$ and a tenth precoding matrix indicator $PMI_{10}$. The receiver 701 may be specifically configured to receive, at a long time interval, $PMI_9$ sent by the receive end, and receive, at a short time interval, $PMI_{10}$ sent by the receive end. The processor 702 may be specifically configured to determine, according to $PMI_9$, $W_1$ selected by the receive end from the codebook based on the reference signal, and determine, according to $PMI_{10}$, $W_4^2$ selected by the receive end from the codebook. Correspondingly, the processor 702 may be further specifically configured to determine the precoding matrix W according to $W_1$ and $W_4^2$.

Optionally, $W_3$ is a matrix indicating a broadband channel characteristic, and $W_4^2$ is a matrix indicating a subband channel characteristic, or $W_3$ is a matrix indicating a long-term channel characteristic, and $W_4^2$ is a matrix indicating a short-term channel characteristic.

Therefore, θ' is selected in this embodiment of the present disclosure, thereby ensuring a weak correlation between codebooks corresponding to antennas with a large spacing.

Optionally, in another implementation manner, values of $\theta_1$ and $\theta_2$ may be $$\theta_1 = \frac{2\pi}{N}(A \cdot i_1 + \lfloor i_2/M \rfloor) \text{ and } \theta_2 = \frac{2\pi}{N}(A \cdot i_1 + i_3)$$

respectively, where $N=2^k$, the k is a non-negative integer, A is a positive integer that can be divided exactly by N (for example, N=16, and A=2), M is a positive integer less than N, $i_1$ is a non-negative integer less than (N/A−1), both $i_2$ and $i_3$ are positive integers, $i_2$ and $i_3$ are independent from each other, and $\lfloor \cdot \rfloor$ is a round-down operation symbol. That is, N is 2 raised to the power, and may be a value of 0, 2, 4, 8, . . . , and the like, $P \in \{0, 1, \ldots, N-1\}$, and $i_1 \in \{0, 1, \ldots, N/A-1\}$.

Optionally, the receiver 701 may be specifically configured to receive a third precoding matrix indicator $PMI_3$ and a fourth precoding matrix indicator $PMI_4$ sent by the receive end. Further, $PMI_3$ and $PMI_4$ sent by the receive end are received in a same period of time or different periods of time. The processor 702 may be specifically configured to determine $i_1$ according to $PMI_3$, and determine $i_2$ and $i_3$ according to $PMI_4$. Specifically, $PMI_4$ may be a joint coding value of $i_2$ and $i_3$, and $PMI_4 = P \cdot i_2 + i_3$. The processor 702 may be specifically configured to determine $i_2$ and $i_3$ by using a value of $PMI_4$ and a correspondence between $i_2$ and $i_3$.

In other words, $PMI_3$ and $PMI_4$ may have different time-domain or frequency-domain granularities. Certainly, the processor 702 may be specifically configured to directly determine the selected precoding matrix W by using a PMI sent by the receive end and received by the receiver 701. For a specific implementation manner, reference may be made to the foregoing embodiment, and details are not described herein again.

It should be understood that a manner of indicating a precoding matrix by the receive end is not limited in this embodiment of the present disclosure.

Optionally, the receiver 701 of the transmit end 700 may receive, by using a physical control channel or physical shared channel, the precoding matrix indicator PMI sent by the receive end. It should be understood that this is not limited in this embodiment of the present disclosure.

Therefore, in this embodiment of the present disclosure, $\theta_1$ and $\theta_2$ may be selected independently according to a current channel characteristic by using $i_2$ and $i_3$ respectively, thereby ensuring a weak correlation between codebooks corresponding to antennas with a large spacing.

Optionally, in another implementation manner, values of $\theta_1$ and $\theta_2$ may also be $$\theta_1 = \frac{2\pi}{N}\left(A \cdot i_1 + \left\lfloor \frac{i_4}{P \cdot M} \right\rfloor\right) \text{ and } \theta_2 = \frac{2\pi}{N}\left(A \cdot i_1 + \left\lfloor \frac{(i_4 \bmod (M \cdot P))}{M} \right\rfloor\right)$$

respectively, where $N=2^k$, k is a non-negative integer, A is a positive integer that can be divided exactly by N, P is a positive integer less than N, $i_1$ is a non-negative integer less than (N/A−1), $i_4$ is a positive integer less than (PM−1) (for example, P=4, M=4, and $i_4$<15), $\lfloor \cdot \rfloor$ is a round-down operation symbol, and mod is a modulo operation symbol. That is, N is 2 raised to the power, and may be a value of 0, 2, 4, 8, ..., and the like, P∈{0, 1, ..., N−1}, and $i_1$∈{0, 1, ..., N/A−1}.

Optionally, the receiver 701 may be specifically configured to receive a fifth precoding matrix indicator $PMI_5$ and a sixth precoding matrix indicator $PMI_6$ sent by the receive end. Further, $PMI_5$ and $PMI_6$ sent by the receive end are received in a same period of time or different periods of time. The processor 702 may be specifically configured to determine $i_1$ according to $PMI_5$, and determine $i_4$ according to $PMI_6$. In other words, $PMI_5$ and $PMI_6$ may have different time-domain or frequency-domain granularities. Certainly, the processor 702 may be specifically configured to directly determine the selected precoding matrix W by using a PMI sent by the receive end and received by the receiver 701. For a specific implementation manner, reference may be made to the foregoing embodiment, and details are not described herein again.

It should be understood that a manner of indicating a precoding matrix by the receive end is not limited in this embodiment of the present disclosure.

Optionally, the receiver 701 of the transmit end 700 may receive, by using a physical control channel or physical shared channel, the precoding matrix indicator PMI sent by the receive end. It should be understood that this is not limited in this embodiment of the present disclosure.

It should be understood that a manner of indicating a precoding matrix by the receive end is not limited in this embodiment of the present disclosure.

Therefore, in this embodiment of the present disclosure, $\theta_1$ and $\theta_2$ may be determined according to a current channel characteristic by using $i_4$, and $\theta_1$ and $\theta_2$ in the selected precoding matrix may be the same or different, thereby ensuring a weak correlation between codebooks corresponding to antennas with a large spacing.

Optionally, in another implementation manner, values of $\theta_1$ and $\theta_2$ may also be $$\theta_1 = 2\pi \frac{m}{N}$$

and $\theta_2=\theta_1+\Delta\theta$ respectively, where $N=2^k$, k is a non-negative integer, m is a non-negative integer less than N, $\Delta\theta=2\pi t$, and an absolute value of t is less than 1, for example, t is ⅛, −1/16, −1/32, 0, 1/32, 1/16 or ⅛.

Similarly, the receiver 701 may be specifically configured to receive two precoding matrix indicators sent by the receive end, and the two precoding matrix indicators indicate $\theta_1$ and $\Delta\theta$ respectively. Further, the two precoding matrix indicators sent by the receive end may also be received in a same period of time or different periods of time, and in other words, the two precoding matrix indicators may have different time-domain or frequency-domain granularities. The processor 702 may be specifically configured to determine the precoding matrix W by using $\theta_1$ and $\Delta\theta$. Certainly, the processor 702 may be specifically configured to directly determine the selected precoding matrix W by using a PMI sent by the receive end and received by the receiver 701. For a specific implementation manner, reference may be made to the foregoing embodiment, and details are not described herein again.

It should be understood that a manner of indicating a precoding matrix by the receive end is not limited in this embodiment of the present disclosure.

Optionally, the receiver 701 of the transmit end 700 may receive, by using a physical control channel or physical shared channel, the precoding matrix indicator PMI sent by the receive end. It should be understood that this is not limited in this embodiment of the present disclosure.

Therefore, in this embodiment of the present disclosure, by using a phase offset $\theta_1$ between $\theta_2$ and $\Delta\theta$, $\Delta\theta$ may be controlled within a limited change range according to a current channel characteristic, thereby ensuring a weak correlation between codebooks corresponding to antennas with a large spacing.

Optionally, as another embodiment, the processor 702 may be further configured to perform row displacement or column displacement on the precoding matrix W according to a serial number of an antenna.

It should be pointed out that, manners of denoting the foregoing codebook (or precoding matrix) by using other equivalent matrices all fall within the scope of the present disclosure. For example, the precoding matrix obtained after the precoding matrix W in this embodiment of the present disclosure is subject to row or column displacement also falls within the scope of the present disclosure, for example, different antenna serial numbers correspondingly cause row displacement of the precoding matrix.

Optionally, as another embodiment, the transmit end 700 may further include a sender 703, and the sender 703 is configured to send the reference signal to the receive end, so that the receive end selects the precoding matrix W from the codebook based on the reference signal. The reference signal includes at least one of the following: a CSI RS, a DM RS and a CRS.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the present disclosure.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in the present application, it should be understood that the disclosed system, apparatus, and method may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. A part or all of the units may be selected according to actual needs to achieve the objectives of the solutions of the embodiments.

In addition, functional units in the embodiments of the present disclosure may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of the present disclosure essentially, or the part contributing to the prior art, or a part of the technical solutions may be implemented in a form of a software product. The software product is stored in a storage medium, and includes several instructions for instructing a computer device (which may be a personal computer, a server, or a network device) to perform all or a part of the steps of the methods described in the embodiments of the present disclosure. The foregoing storage medium includes: any medium that can store program code, such as a USB flash drive, a removable hard disk, a read-only memory (ROM), a random access memory (RAM), a magnetic disk, or an optical disc.

The foregoing descriptions are merely specific implementation manners of the present disclosure, but are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. A method for feeding back a precoding matrix indicator, comprising:

selecting, by a receive end, a precoding matrix W from a codebook based on a reference signal, wherein the precoding matrix $$W \in \begin{bmatrix} X_1(\theta_1) \\ X_2(\theta_2, \varphi_n) \end{bmatrix},$$

a matrix $X_1$ is determined according to $\theta_1$, a matrix $X_2$ is determined according to $\theta_2$ and $\phi_n$, the $\theta_1$ indicates a phase difference of weighted values for signal transmission between two neighboring antennas in a first antenna group of a transmit end, wherein the signal transmission between the two neighboring antennas in the first antenna group is for a same transmission layer, the $\theta_2$ indicates a phase difference of weighted values for signal transmission between two neighboring antennas in a second antenna group of the transmit end, wherein the signal transmission between the two neighboring antennas in the second antenna group is for a transmission layer, the $\phi_n$ indicates a phase difference of weighted values for signal transmission between the first antenna group and the second antenna group, wherein the signal transmission between the first antenna group and the second antenna group is for a same transmission layer, the $$\varphi_n = e^{\frac{j2\pi n}{M}},$$

the M is a positive integer, the n is a non-negative integer less than the M, $\theta_1$ and $\theta_2$ of at least one precoding matrix in the codebook are different, and the first antenna group and the second antenna group belong to a same multi-antenna system; and sending, by the receive end, a precoding matrix indicator (PMI) to the transmit end, to enable the transmit end to determine the precoding matrix W according to the PMI.

2. The method according to claim 1, wherein when a rank indicator is 1, the $$\begin{bmatrix} X_1(\theta_1) \\ X_2(\theta_2, \varphi_n) \end{bmatrix} = \alpha \begin{bmatrix} X & 0 \\ 0 & X \end{bmatrix} \cdot \begin{bmatrix} Y_1 \\ \varphi_n Y_2 \end{bmatrix};$$

or
when a rank indicator is 2, the $$\begin{bmatrix} X_1(\theta_1) \\ X_2(\theta_2, \varphi_n) \end{bmatrix} = \beta \begin{bmatrix} X & 0 \\ 0 & X \end{bmatrix} \cdot \begin{bmatrix} Y_1 & Y_1 \\ \varphi_n Y_2 & -\varphi_n Y_2 \end{bmatrix},$$

wherein both the α and the β are constants, the $$X = \begin{bmatrix} 1 & 1 & & 1 \\ e^{j2\pi \frac{m}{N}} & e^{j2\pi \frac{m+1}{N}} & \ldots & e^{j2\pi \frac{m+(P-1)}{N}} \end{bmatrix},$$

the Y1 and Y2 are P×1-dimensional column selection vectors independent from each other, $N=2^k$, k is a non-negative integer, m is a non-negative integer less than N, and the P is a positive integer less than N.

3. The method according to claim 1, wherein when a rank indicator is 1, the $$\begin{bmatrix} X_1(\theta_1) \\ X_2(\theta_2, \varphi_n) \end{bmatrix} = \begin{bmatrix} X'_{m1} & 0 \\ 0 & DX'_{m1} \end{bmatrix} \cdot \frac{1}{2} \begin{bmatrix} Y \\ \varphi_n Y \end{bmatrix}; \text{ or}$$

$$\begin{bmatrix} X_1(\theta_1) \\ X_2(\theta_2, \varphi_n) \end{bmatrix} = \begin{bmatrix} X'_{m1} & 0 \\ 0 & DX'_{m1} \end{bmatrix} \cdot \frac{1}{2} \begin{bmatrix} Y'_1 \\ \varphi_n Y'_2 \end{bmatrix}, \text{ wherein}$$

$$D = \begin{bmatrix} 1 & 0 \\ 0 & e^{j\theta'} \end{bmatrix}, X'_{m1} = \begin{bmatrix} 1 & 1 & & 1 \\ e^{j2\pi \frac{m1+n_1}{N}} & e^{j2\pi \frac{m1+n_2}{N}} & \ldots & e^{j2\pi \frac{m1+n_P}{N}} \end{bmatrix},$$

$n_1, n_2, \ldots, n_P$ are all integers, Y, $Y_1'$ and $Y_2'$ are all P×1-dimensional column selection vectors, $N=2^k$, k is a non-negative integer, m1 is a non-negative integer less than N, the P is a positive integer less than N, $\alpha$ is a constant, and $\theta'$ is a real number.

4. The method according to claim 1, wherein when a rank indicator is 2, $$\begin{bmatrix} X_1(\theta_1) \\ X_2(\theta_2, \varphi_n) \end{bmatrix} = \begin{bmatrix} X'_{m1} & 0 \\ 0 & DX'_{m1} \end{bmatrix} \cdot \frac{1}{\sqrt{8}} \begin{bmatrix} Y_3 & Y_3 \\ \varphi_n Y_4 & -\varphi_n Y_4 \end{bmatrix}, \text{ wherein}$$

$$D = \begin{bmatrix} 1 & 0 \\ 0 & e^{j\theta'} \end{bmatrix}, X'_{m1} = \begin{bmatrix} 1 & 1 & \cdots & 1 \\ e^{j2\pi \frac{m1+n_1}{N}} & e^{j2\pi \frac{m1+n_2}{N}} & \cdots & e^{j2\pi \frac{m1+n_P}{N}} \end{bmatrix},$$

and $n_1, n_2, \ldots, n_P$ are all integers, both $Y_3$ and $Y_4$ are $P \times 1$-dimensional column selection vectors, $N=2^k$, k is a non-negative integer, m1 is a non-negative integer less than N, the P is a positive integer less than N, $\beta$ is a constant, and $\theta'$ is a real number.

5. The method according to claim 1, wherein when a rank indicator is 2, the $$\begin{bmatrix} X_1(\theta_1) \\ X_2(\theta_2, \varphi_n) \end{bmatrix} = \begin{bmatrix} X'_{m1} & 0 \\ 0 & DX'_{m1} \end{bmatrix} \cdot \frac{1}{\sqrt{8}} \begin{bmatrix} Y_3 & Y_4 \\ \varphi_n Y_3 & -\varphi_n Y_4 \end{bmatrix},$$

wherein the $\theta_1$ indicates a phase difference of weighted values for signal transmission between two neighboring antennas in the first antenna group of the transmit end, wherein the signal transmission between the two neighboring antennas in the first antenna group is for a first transmission layer of two transmission layers, the $\theta_2$ indicates a phase difference of weighted values for signal transmission between two neighboring antennas in the second antenna group of the transmit end, wherein the signal transmission between the two neighboring antennas in the second antenna group is for the first transmission layer of the two transmission layers, the $\theta_3$ indicates a phase difference of weighted values for signal transmission between two neighboring antennas in the first antenna group of the transmit end, wherein the signal transmission between the two neighboring antennas in the first antenna group is for a second transmission layer of the two transmission layers, the $\theta_4$ indicates a phase difference of weighted values for signal transmission between two neighboring antennas in the second antenna group of the transmit end, wherein the signal transmission between the two neighboring antennas in the second antenna group is for the second transmission layer of the two transmission layers, $$D = \begin{bmatrix} 1 & 0 \\ 0 & e^{j\theta'} \end{bmatrix}, X'_{m1} = \begin{bmatrix} 1 & 1 & \cdots & 1 \\ e^{j2\pi \frac{m1+n_1}{N}} & e^{j2\pi \frac{m1+n_2}{N}} & \cdots & e^{j2\pi \frac{m1+n_P}{N}} \end{bmatrix},$$

$n_1, n_2, \ldots, n_P$ are all integers, both $Y_3$ and $Y_4$ are $P \times 1$-dimensional column selection vectors, the D, $Y_3$, $Y_4$ and $\phi_n$ enable two columns in any precoding matrix in a codebook set to be orthogonal to each other, $N=2^k$, k is a non-negative integer, m1 is a non-negative integer less than N, the P is a positive integer less than N, $\beta$ is a constant, and $\theta'$ is a real number.

6. The method according to claim 1, wherein the $$\theta_1 = \frac{2\pi}{N}\left(A \cdot i_1 + \left\lfloor \frac{i_4}{P \cdot M} \right\rfloor\right), \text{ and the } \theta_2 = \frac{2\pi}{N}\left(A \cdot i_1 + \left\lfloor \frac{(i_4 \mod(M \cdot P))}{M} \right\rfloor\right),$$

wherein the $N=2^k$, the k is a non-negative integer, the A is a positive integer that can be divided exactly by the N, the P is a positive integer less than the N, the $i_1$ is a non-negative integer less than (N/A−1), $\lfloor \cdot \rfloor$ is a round-down operation symbol, and mod is a modulo operation symbol.

7. The method according to claim 1, wherein the $\theta_2 = \theta_1 + \Delta\theta$, wherein the $$\theta_1 = 2\pi \frac{m}{N},$$

the $N=2^k$, the k is a non-negative integer, the m is a non-negative integer less than the N, the $\Delta\theta=2\pi t$, and an absolute value of the t is less than 1.

8. The method according to claim 1, wherein after the selecting, by a receive end, a precoding matrix W from a codebook based on a reference signal, the method further comprises:
performing, by the receive end, row displacement or column displacement on the precoding matrix W according to a serial number of an antenna.

9. The method according to claim 1, wherein before the selecting, by a receive end, a precoding matrix W from a codebook based on a reference signal, the method further comprises:
receiving, by the receive end, the reference signal sent by the transmit end, wherein
the reference signal comprises at least one of the following: a channel state information reference signal (CSI RS), a demodulation reference signal (DM RS), and a cell-specific reference signal (CRS).

10. A receive end, comprising:
a processor, configured to select a precoding matrix W from a codebook based on a reference signal, wherein the precoding matrix $$W \in \begin{bmatrix} X_1(\theta_1) \\ X_2(\theta_2, \varphi_n) \end{bmatrix},$$

a matrix $X_1$ is determined according to $\theta_1$, a matrix $X_2$ is determined according to $\theta_2$ and $\phi_n$, the $\theta_1$ indicates a phase difference of weighted values for signal transmission between two neighboring antennas in a first antenna group of a transmit end, wherein the signal transmission between the two neighboring antennas in the first antenna group is for a same transmission layer, the $\theta_2$ indicates a phase difference of weighted values for signal transmission between two neighboring antennas in a second antenna group of the transmit end, wherein the signal transmission between the two neighboring antennas in the second antenna group is for the same transmission layer, the $\phi_n$ indicates a phase difference of weighted values for signal transmission between the first antenna group and the second antenna group, wherein the signal transmission between the first antenna group and the second antenna group is for a same transmission layer, the $$\varphi_n = e^{\frac{j2\pi n}{M}},$$

M is a positive integer, n is a non-negative integer less than M, $\theta_1$ and $\theta_2$ of at least one precoding matrix in the codebook are different, and the first antenna group and the second antenna group belong to a same multi-antenna system; and a sender, configured to send a precoding matrix indicator (PMI) to the transmit end, to enable the transmit end to determine, according to the PMI, the precoding matrix W selected by the processor.

11. The receive end according to claim 10, wherein when a rank indicator determined by the processor is 1, for the precoding matrix W selected by the processor, $$\begin{bmatrix} X_1(\theta_1) \\ X_2(\theta_2, \varphi_n) \end{bmatrix} = \alpha \begin{bmatrix} X & 0 \\ 0 & X \end{bmatrix} \cdot \begin{bmatrix} Y_1 \\ \varphi_n Y_2 \end{bmatrix};$$

or
when a rank indicator determined by the processor is 2, for the precoding matrix W selected by the processor, $$\begin{bmatrix} X_1(\theta_1) \\ X_2(\theta_2, \varphi_n) \end{bmatrix} = \beta \begin{bmatrix} X & 0 \\ 0 & X \end{bmatrix} \cdot \begin{bmatrix} Y_1 & Y_1 \\ \varphi_n Y_2 & -\varphi_n Y_2 \end{bmatrix},$$

wherein both the $\alpha$ and the $\beta$ are constants, the $$X = \begin{bmatrix} 1 & 1 & & 1 \\ e^{j2\pi \frac{m}{N}} & e^{j2\pi \frac{m+1}{N}} & \ldots & e^{j2\pi \frac{m+(P-1)}{N}} \end{bmatrix},$$

the Y1 and Y2 are P×1-dimensional column selection vectors independent from each other, the $N=2^k$, the k is a non-negative integer, the m is a non-negative integer less than the N, and the P is a positive integer less than the N.

12. The receive end according to claim 10, wherein when a rank indicator determined by the processor is 1, for the precoding matrix W selected by the processor, $$\begin{bmatrix} X_1(\theta_1) \\ X_2(\theta_2, \varphi_n) \end{bmatrix} = \begin{bmatrix} X'_{m1} & 0 \\ 0 & DX'_{m1} \end{bmatrix} \cdot \frac{1}{2} \begin{bmatrix} Y \\ \varphi_n Y \end{bmatrix}; \text{ or}$$

$$\begin{bmatrix} X_1(\theta_1) \\ X_2(\theta_2, \varphi_n) \end{bmatrix} = \begin{bmatrix} X'_{m1} & 0 \\ 0 & DX'_{m1} \end{bmatrix} \cdot \frac{1}{2} \begin{bmatrix} Y'_1 \\ \varphi_n Y'_2 \end{bmatrix}, \text{ wherein}$$

$$D = \begin{bmatrix} 1 & 0 \\ 0 & e^{j\theta'} \end{bmatrix}, X'_{m1} = \begin{bmatrix} 1 & 1 & & 1 \\ e^{j2\pi \frac{m1+n_1}{N}} & e^{j2\pi \frac{m1+n_2}{N}} & \ldots & e^{j2\pi \frac{m1+n_P}{N}} \end{bmatrix},$$

and $n_1, n_2, \ldots, n_P$ are all integers, Y, $Y_1'$ and $Y_2'$ are all P×1-dimensional column selection vectors, $N=2^k$, k is a non-negative integer, m1 is a non-negative integer less than N, the P is a positive integer less than N, $\alpha$ is a constant, and $\theta'$ is a real number.

13. The receive end according to claim 10, wherein when a rank indicator determined by the processor is 2, for the precoding matrix W selected by the selection unit, $$\begin{bmatrix} X_1(\theta_1) \\ X_2(\theta_2, \varphi_n) \end{bmatrix} = \begin{bmatrix} X'_{m1} & 0 \\ 0 & DX'_{m1} \end{bmatrix} \cdot \frac{1}{\sqrt{8}} \begin{bmatrix} Y_3 & Y_3 \\ \varphi_n Y_4 & -\varphi_n Y_4 \end{bmatrix},$$

wherein $D = \begin{bmatrix} 1 & 0 \\ 0 & e^{j\theta'} \end{bmatrix}, X'_{m1} = \begin{bmatrix} 1 & 1 & & 1 \\ e^{j2\pi \frac{m1+n_1}{N}} & e^{j2\pi \frac{m1+n_2}{N}} & \ldots & e^{j2\pi \frac{m1+n_P}{N}} \end{bmatrix},$ and $n_1, n_2, \ldots, n_P$ are all integers, both $Y_3$ and $Y_4$ are P×1-dimensional column selection vectors, $N=2^k$, k is a non-negative integer, m1 is a non-negative integer less than N, the P is a positive integer less than N, $\beta$ is a constant, and $\theta'$ is a real number.

14. The receive end according to claim 10, wherein when a rank indicator determined by the processor is 2, for the precoding matrix W selected by the processor, $$\begin{bmatrix} X_1(\theta_1) \\ X_2(\theta_2, \varphi_n) \end{bmatrix} = \begin{bmatrix} X'_{m1} & 0 \\ 0 & DX'_{m1} \end{bmatrix} \cdot \frac{1}{\sqrt{8}} \begin{bmatrix} Y_3 & Y_4 \\ \varphi_n Y_3 & -\varphi_n Y_4 \end{bmatrix},$$

wherein the $\theta_1$ indicates a phase difference of weighted values for signal transmission between two neighboring antennas in the first antenna group of the transmit end, wherein the signal transmission between the two neighboring antennas in the first antenna group is for a first transmission layer of two transmission layers, the $\theta_2$ indicates a phase difference of weighted values for signal transmission between two neighboring antennas in the second antenna group of the transmit end, wherein the signal transmission between the two neighboring antennas in the second antenna group is for the first transmission layer of the two transmission layers, the $\theta_3$ indicates a phase difference of weighted values for signal transmission between two neighboring antennas in the first antenna group of the transmit end, wherein the signal transmission between the two neighboring antennas in the first antenna group is for a second transmission layer of the two transmission layers, the $\theta_4$ indicates a phase difference of weighted values for signal transmission between two neighboring antennas in the second antenna group of the transmit end, wherein the signal transmission between the two neighboring antennas in the second antenna group is for the second transmission layer of the two transmission layers, $$D = \begin{bmatrix} 1 & 0 \\ 0 & e^{j\theta'} \end{bmatrix},$$

$$X'_{m1} = \begin{bmatrix} 1 & 1 & & 1 \\ e^{j2\pi \frac{m1+n_1}{N}} & e^{j2\pi \frac{m1+n_2}{N}} & \ldots & e^{j2\pi \frac{m1+n_P}{N}} \end{bmatrix}, n_1, n_2, \ldots, n_P$$

are all integers, both $Y_3$ and $Y_4$ are P×1-dimensional column selection vectors, the D, $Y_3$, $Y_4$ and $\phi_n$ enable two columns in any precoding matrix in a codebook set to be orthogonal to each other, $N=2^k$, k is a non-negative integer, m1 is a non-negative integer less than N, the P is a positive integer less than N, β is a constant, and θ' is a real number.

15. The receive end according to claim 10, wherein the $$\theta_1 = \frac{2\pi}{N}\left(A \cdot i_1 + \left\lfloor \frac{i_4}{P \cdot M} \right\rfloor\right), \text{ and the } \theta_2 = \frac{2\pi}{N}\left(A \cdot i_1 + \left\lfloor \frac{(i_4 \bmod (M \cdot P))}{M} \right\rfloor\right),$$

wherein the $N=2^k$, k is a non-negative integer, the A is a positive integer that can be divided exactly by the N, the P is a positive integer less than the N, the $i_1$ is a non-negative integer less than (N/A−1), $\lfloor \cdot \rfloor$ is a round-down operation symbol, and mod is a modulo operation symbol.

16. The receive end according to claim 10, wherein the $\theta_2 = \theta_1 + \Delta\theta$, wherein the $$\theta_1 = 2\pi \frac{m}{N},$$

the $N=2^k$, the k is a non-negative integer, the m is a non-negative integer less than the N, the $\Delta\theta = 2\pi t$, and an absolute value of the t is less than 1.

17. The receive end according to claim 10, wherein the processor is configured to perform row displacement or column displacement on the precoding matrix W according to a serial number of an antenna.

18. The receive end according to claim 10, wherein the receive end further comprises a receiver, and the receiver is configured to receive the reference signal sent by the transmit end, wherein the reference signal comprises at least one of the following: a channel state information reference signal (CSI RS), a demodulation reference signal (DM RS), and a cell-specific reference signal (CRS).

\* \* \* \* \*